(12) United States Patent
Aio et al.

(10) Patent No.: US 12,048,007 B2
(45) Date of Patent: Jul. 23, 2024

(54) COMMUNICATION APPARATUS AND COMMUNICATION METHOD

(71) Applicant: Sony Group Corporation, Tokyo (JP)

(72) Inventors: Kosuke Aio, Tokyo (JP); Ryuichi Hirata, Tokyo (JP); Shigeru Sugaya, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 429 days.

(21) Appl. No.: 17/432,102

(22) PCT Filed: Dec. 16, 2019

(86) PCT No.: PCT/JP2019/049250
§ 371 (c)(1),
(2) Date: Aug. 19, 2021

(87) PCT Pub. No.: WO2020/174823
PCT Pub. Date: Sep. 3, 2020

(65) Prior Publication Data
US 2022/0191930 A1 Jun. 16, 2022

(30) Foreign Application Priority Data
Feb. 27, 2019 (JP) ................. 2019-034942

(51) Int. Cl.
*H04W 74/0816* (2024.01)
*H04B 7/0413* (2017.01)
(Continued)

(52) U.S. Cl.
CPC ...... *H04W 74/0816* (2013.01); *H04B 7/0413* (2013.01); *H04W 16/14* (2013.01); *H04W 76/15* (2018.02)

(58) Field of Classification Search
CPC ....... H04B 7/0413; H04B 7/088; H04L 5/001; H04W 16/14; H04W 72/0453;
(Continued)

(56) References Cited

U.S. PATENT DOCUMENTS

2009/0086802 A1* 4/2009 Nabetani ............... H04W 28/20
375/225
2016/0234835 A1* 8/2016 Yerramalli ........ H04W 74/0808
(Continued)

FOREIGN PATENT DOCUMENTS

| JP | 2017-28746 A | 2/2017 |
| JP | 2018-98806 A | 6/2018 |
| JP | 2018-170654 A | 11/2018 |

OTHER PUBLICATIONS

International Search Report and Written Opinion mailed on Jan. 28, 2020, received for PCT Application PCT/JP2019/049250, Filed on Dec. 16, 2019, 8 pages including English Translation.

*Primary Examiner* — Khaled M Kassim
*Assistant Examiner* — Kai Chang
(74) *Attorney, Agent, or Firm* — XSENSUS LLP

(57) ABSTRACT

To provide a communication apparatus that achieves a high efficiency in carrier aggregation.
A communication apparatus includes a communication section that transmits and receives a radio signal using a first communication band and a second communication band, and a controller that controls an operation of communication performed by the communication section, and the controller performs control such that a signal that includes information regarding a clear channel of the second communication band is transmitted using a channel of the first communication band. Further, the controller performs control such that data is transmitted to a transmission destination of the signal using one of a plurality of the clear channels of the second (Continued)

communication band, the plurality of the clear channels of the second communication band being included in the signal.

9 Claims, 15 Drawing Sheets

(51) Int. Cl.
*H04W 16/14* (2009.01)
*H04W 76/15* (2018.01)

(58) Field of Classification Search
CPC .......... H04W 74/002; H04W 74/0808; H04W 74/0816; H04W 76/16; H04W 88/06
See application file for complete search history.

(56) References Cited

U.S. PATENT DOCUMENTS

| | | | | |
|---|---|---|---|---|
| 2017/0332280 A1* | 11/2017 | Kuroda | ................. | H04W 72/23 |
| 2018/0176953 A1* | 6/2018 | Hampel | ............ | H04W 74/0816 |
| 2018/0176955 A1* | 6/2018 | Salem | ............... | H04W 74/0808 |
| 2019/0090279 A1* | 3/2019 | Sun | ....................... | H04W 72/23 |
| 2020/0163037 A1* | 5/2020 | Zheng | ................... | H04L 5/0048 |
| 2021/0385006 A1* | 12/2021 | Ryu | ..................... | H04L 5/0098 |

* cited by examiner

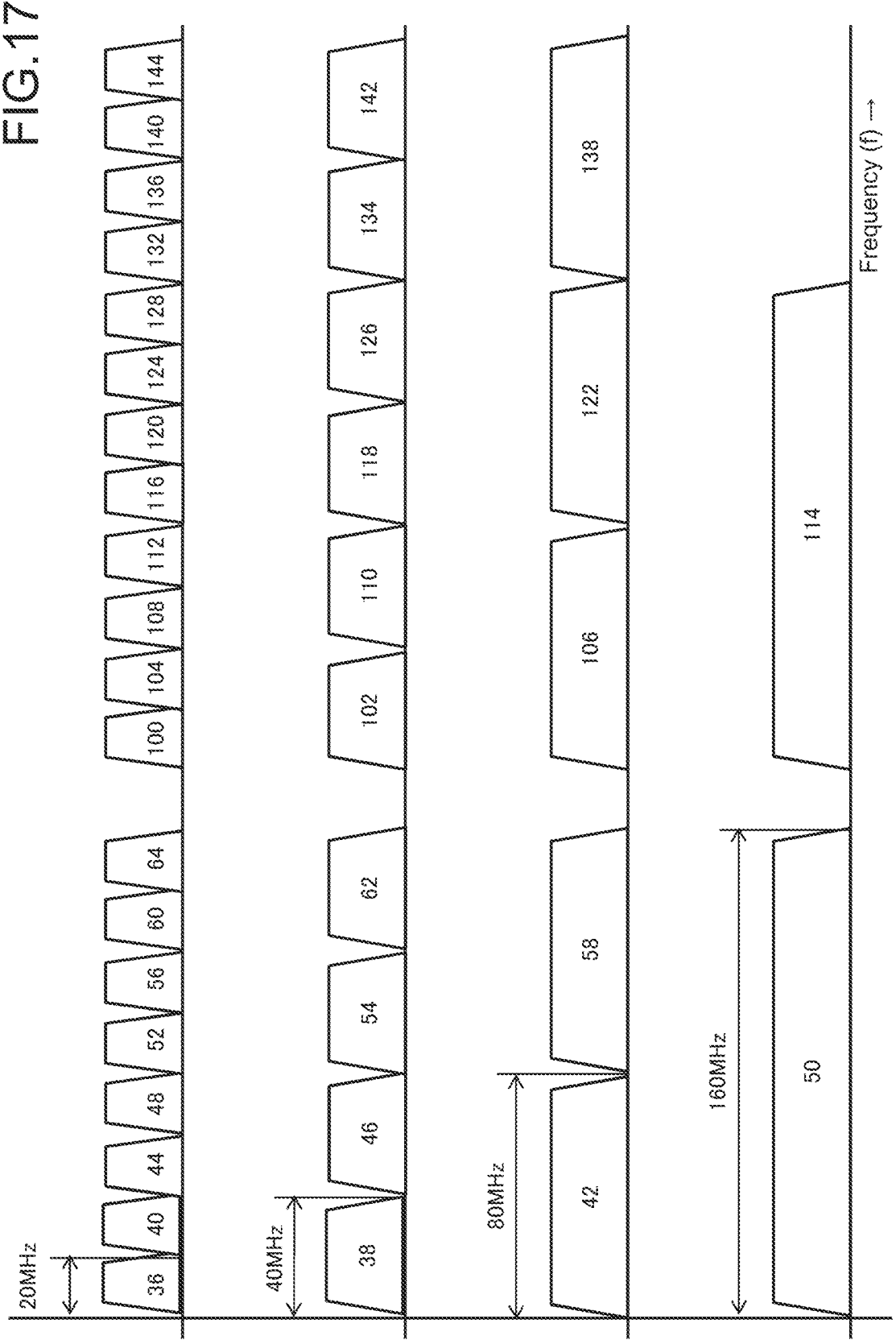

COMMUNICATION APPARATUS AND COMMUNICATION METHOD

CROSS-REFERENCE TO RELATED APPLICATIONS

The present application is based on PCT filing PCT/JP2019/049250, filed Dec. 16, 2019, which claims priority to JP 2019-034942, filed Feb. 27, 2019, the entire contents of each are incorporated herein by reference.

TECHNICAL FIELD

The technology disclosed herein relates to a communication apparatus and a communication method that are used to transmit and receive a radio signal.

BACKGROUND ART

There is a need to increase data capacity and enhance a peak throughput in a wireless local area network (LAN), in order to cope with an increase in request data traffic in recent years. Carrier aggregation used to perform communication using a plurality of frequency bands at the same time has drawn attention as a method for increasing data capacity and enhancing a peak throughput in a wireless LAN. The carrier aggregation is expected to be standardized by a next-generation standard of IEEE 802.11.

In the case of a currently applied channel access using carrier-sense multiple access with collision avoidance (CSMA/CA), carrier sensing is performed with respect to a primary channel (hereinafter also referred to as a "PCH") of each frequency band. Communication using carrier aggregation is not allowed to be started unless it is determined that communication using the PCHs of the respective frequency bands is not being performed (hereinafter also referred to as "being idle" or "being in an idle state"). In other words, when a PCH of a certain frequency band is idle but a PCH of another frequency band is not idle, it is necessary that a transmission terminal wait until all of the PCHs become idle. This results in an overhead due to awaiting transmission and thus in a reduction in communication efficiency.

Further, a wireless communication apparatus has been proposed that uses statistical data to perform timely communication when respective channels become idle (refer to, for example, Patent Literature 1). This may result in a significant increase in an amount of processing performed by a transmission terminal.

CITATION LIST

Patent Literature

Patent Literature 1: Japanese Patent Application Laid-open No. 2017-28746

DISCLOSURE OF INVENTION

Technical Problem

It is an object of the technology disclosed herein to provide a communication apparatus and a communication method that are used to perform a channel access using CSMA/CA.

Solution to Problem

The technology disclosed herein has been achieved in view of the problems described above, and a first aspect of the technology disclosed herein is a communication apparatus that includes
  a communication section that transmits and receives a radio signal using a first communication band and a second communication band, and
  a controller that controls an operation of communication performed by the communication section, the controller performing control such that a signal that includes information regarding a clear channel of the second communication band is transmitted using a channel of the first communication band.

Further, the controller performs control such that data is transmitted to a transmission destination of the signal using one of a plurality of the clear channels of the second communication band, the plurality of the clear channels of the second communication band being included in the signal.

Furthermore, the controller performs control such that data is transmitted using a channel that is specified by a response signal from the transmission destination of the signal, the specified channel being from among the plurality of the clear channels included in the signal.

Further, a second aspect of the technology disclosed herein is a communication method for performing a wireless communication using a first communication band and a second communication band, the communication method including
  transmitting, using a channel of the first communication band, a signal that includes information regarding a clear channel of the second communication band, and
  transmitting data to a transmission destination of the signal using the clear channel included in the signal.

Further, a third aspect of the technology disclosed herein is a communication apparatus that includes
  a communication section that transmits and receives a radio signal using a first communication band and a second communication band, and
  a controller that controls an operation of communication performed by the communication section, the controller performing control such that a signal that includes information regarding a clear channel of the second communication band is received using a channel of the first communication band.

The controller performs control such that a reception operation is performed using one of a plurality of the clear channels included in the signal addressed to the communication apparatus.

Further, the controller performs control such that a response signal that includes information regarding a channel selected from a plurality of the clear channels included in the signal addressed to the communication apparatus, is returned, and the controller performs control such that a reception operation is performed using the channel included in the response signal.

Further, a fourth aspect of the technology disclosed herein is a communication method for performing a wireless communication using a first communication band and a second communication band, the communication method including
  receiving, using a channel of the first communication band, a signal that includes information regarding a clear channel of the second communication band, and controlling, on the basis of the information included in the signal, transmission and reception of data that are performed using the second communication band.

Advantageous Effects of Invention

The technology disclosed herein makes it possible to provide a communication apparatus and a communication method that achieve a high efficiency in carrier aggregation in conformity to a scheme of a channel access using CSMA/CA.

Note that the effects described herein are merely illustrative, and effects provided by the present disclosure are not limited thereto. The present disclosure may further provide an additional effect in addition to the effects described above.

Other objects, features, and advantages of the technology disclosed herein will be apparent from more detailed description based on embodiments described below and the accompanying drawings.

BRIEF DESCRIPTION OF DRAWINGS

FIG. 17 illustrates arrangement of a frequency channel that can be used in a wireless LAN system.

MODE(S) FOR CARRYING OUT THE INVENTION

Figure 1:
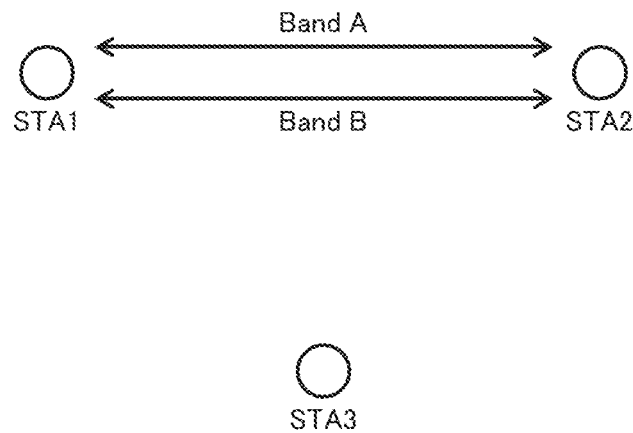
FIG. 1 schematically illustrates an example of a configuration of a communication system.

Embodiments of the technology disclosed herein will be described in detail below with reference to the drawings.

FIG. 17 illustrates arrangement of a frequency channel that can be used in a wireless LAN system. Here, the figure illustrates a channel arrangement in the currently available 5-GHz band.

A configuration in which a channel is used for every 20 MHz is given in an uppermost portion in FIG. 17, where channels 36, 40, 44, 48, 52, 56, 60, and 64 are arranged in order from low to high frequencies. Channels 100, 104, 108, 112, 116, 120, 124, 128, 132, 136, 140, 144 are arranged with respect to higher frequencies.

Further, a configuration in which a channel is used for every 40 MHz is given in the second portion from the top in FIG. 17, where channels 38, 46, 54, and 62 are arranged in order from low to high frequencies. Channels 102, 110, 118, 126, 134, and 142 are arranged with respect to higher frequencies.

Furthermore, a configuration in which a channel is used for every 80 MHz is given in the third portion from the top in FIG. 17, where channels 42 and 58 are arranged in order from low to high frequencies. Channels 106, 122, and 138 are arranged with respect to higher frequencies.

Moreover, a configuration in which a channel is used for every 160 MHz is given in the fourth portion from the top in FIG. 17, where channel 50 is arranged. A channel 114 is arranged with respect to a higher frequency.

Note that the range of the available frequency channels illustrated in FIG. 17 may differ by country since a legislated available frequency band differs by country. Further, the channel arrangement is also applicable to, for example, a frequency band (the 2.4-GHz band) other than the frequency band described above, and a frequency band (the 6-GHz band) that can be newly used (or that is an unlicensed band). The channel arrangement is also applicable to the case in which those different frequency bands are used in combination.

A communication system in which, for example, two frequency bands (hereinafter also referred to as "communication bands") that are the 2.4-GHz band and the 5-GHz band (or the 6-GHz band) are used at the same time is assumed in the following description. When the 2.4-GHz band and the 5-GHz or 6-GHz band are compared, it can also be said that the 5-GHz or 6-GHz communication band that is a higher-frequency band is suitable for transmitting large volumes of data.

As illustrated in FIG. 17, each communication band includes a plurality of channels. Typically, a primary channel (PCH) that is primarily used in a wireless communication is determined for each communication band in a network such as a basic service set (BSS). When a communication terminal performs a channel access using CSMA/CA in a certain communication band, the communication terminal performs carrier sensing with respect to a PCH of the certain communication band.

Considering that a channel is used for every 20 MHz, and a channel may be used for every 160 MHz at the maximum by making a communication band broader, it is assumed that a communication terminal can perform carrier sensing in a 160-MHz range including a PCH even when the communication terminal uses a channel for every 20 MHz. Further, when a channel is used for every 20 MHz, a channel that is in a 160-MHz carrier-sensing range including a PCH and on which carrier sensing is performed at the same time (that is, a channel that is other than a PCH and on which carrier sensing is performed) will also be hereinafter referred to as a secondary channel (SCH). When carrier sensing is performed on a PCH of a certain communication band, a result of carrier sensing performed on an SCH is also be obtained at the same time. Likewise, when a channel is used for every 40 MHz or for every 80 MHz, a channel that is other than a PCH and on which carrier sensing is performed is an SCH.

FIG. 1 schematically illustrates an example of a configuration of a communication system to which the technology disclosed herein is applied. It is assumed that the illustrated communication system includes a plurality of stations (STAs: slaves).

It is assumed that, when STA1 and STA2 communicate data to each other, a communication band that is Band A and a communication band that is Band B can be used at the same time, that is, communicating using carrier aggregation can be performed. Band A and Band B each include a primary channel (PCH).

Here, Band A and Band B refer to, for example, the 920-MHz band, the 2.4-GHz band, and the 5-GHz band, which are currently assigned as unlicensed bands, and the 6-GHz band expected to be assigned as an unlicensed band in the future. A combination for each band is not particularly limited. Further, carrier aggregation using at least two communication bands may be performed between STA1 and STA2.

On the other hand, STA3 is another STA situated in a range in which signals of STA1 and STA2 reach. STA3 may belong to the same BSS as STA1 and STA2, or may belong to another BSS.

Note that a configuration of the communication system to which the technology disclosed herein is applied is not limited to the configuration illustrated in FIG. 1. It is sufficient if there is a plurality of communication apparatuses between which connection has been established, and one of the plurality of communication apparatuses is a surrounding terminal for another of the plurality of communication apparatuses. Any positional relationship may be adopted as long as the condition described above is satisfied. Further, one of STA1 and STA2 may be an access point (AP: base station), although this is not specifically described herein.

Figure 2:
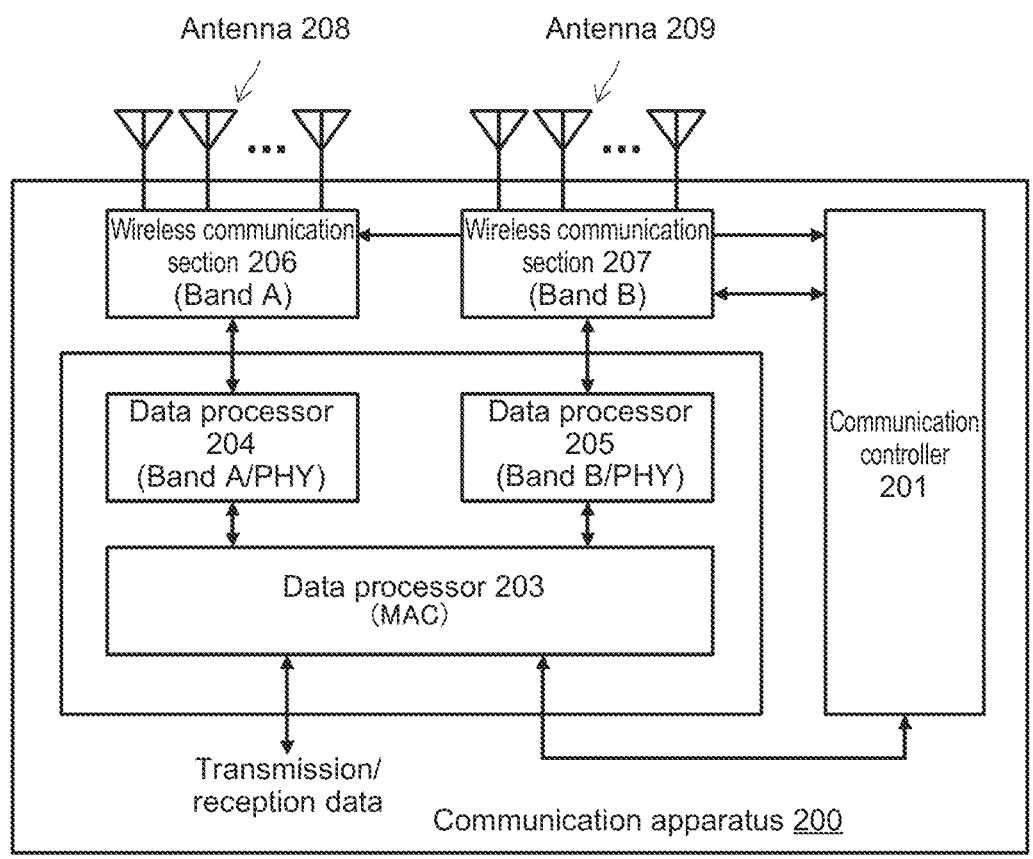
FIG. 2 illustrates an example of a functional configuration of a communication apparatus 200.

FIG. 2 illustrates an example of a functional configuration of a communication apparatus 200 that operates as an STA (including an AP). Each component included in the communication apparatus 200 is described below.

A communication controller 201 controls an entire operation of the communication apparatus 200, and, further, the communication controller 201 performs processing of delivering, to a data processor 202, control information that is notified to another communication terminal. In the present embodiment, the communication controller 201 performs selection and switching of a transmission/reception channel in wireless communication sections 206 and 207 in order to perform communication using carrier aggregation, and the communication controller 201 generates and acquires a signal including information regarding a channel for carrier aggregation.

The data processor 202 primarily generates a transmission signal on the basis of transmission data from an upper layer and control information received from the communication controller 201. Further, the data processor 202 demodulates a reception signal received from the wireless communication sections 206 and 207 to perform processing of extracting reception data and control information.

The communication apparatus 200 according to the present embodiment is a communication terminal that performs communication using carrier aggregation by use of the two communication bands that are Band A and Band B. Thus, as illustrated in FIG. 2, the data processor 202 includes a shared data processor 203 in a media-access-control (MAC) layer, and includes separate data processors in a PHY layer that are a data processor 204 for Band A and a data processor 205 for Band B. The reason is that such a configuration makes it possible to perform communication in a plurality of communication bands at the same time, and to perform an entire data management (such as management of a sequence number) in common.

The wireless communication sections 206 and 207 perform an analog conversion and radio frequency (RF) processing with respect to a transmission signal generated by the data processor 202 to generate radio signals respectively output from antennas 208 and 209. Further, the wireless communication sections 206 and 207 perform RF processing and a digital conversion with respect to radio signals respectively input to the antennas 208 and 209 to generate reception signals, and deliver the generated reception signals to the data processor 202. One of the wireless communication sections, the wireless communication section 206, performs processing on a radio signal using Band A, and another of the wireless communication sections, the wireless communication section 207, performs processing on a radio signal using Band B.

Note that, when a multiple-input-multiple-output (MIMO) communication is performed using Band A and a MIMO communication is performed using Band B, the wireless communication sections 206 and 207 each include a plurality of antennas, and the PHY-layer data processors 204 and 205 each perform spatial multiplexing processing and spatial separation processing.

Figure 3:
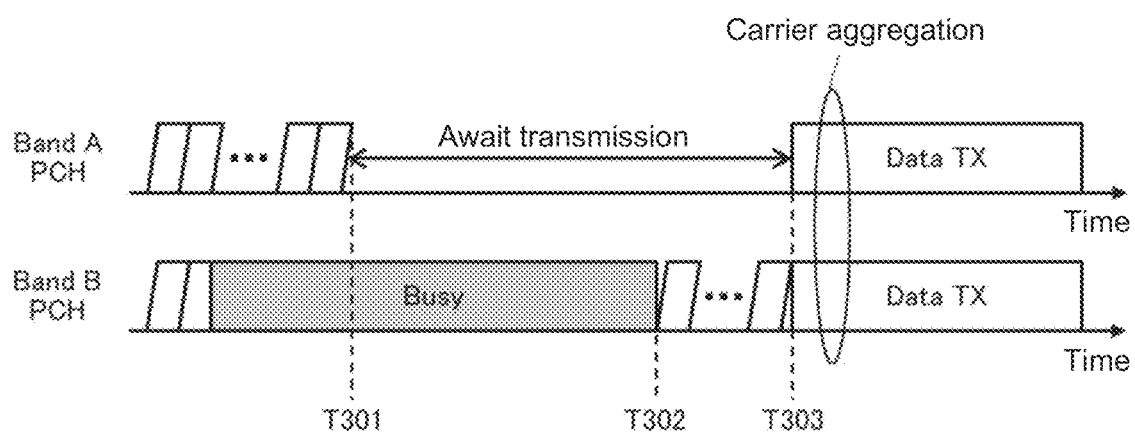
FIG. 3 illustrates an example of an operation performed when data transmission is performed using carrier aggregation by use of two communication bands that are Band A and Band B, the operation being performed for each of the communication bands.

FIG. 3 illustrates an example of an operation performed when a transmission terminal transmits data using carrier aggregation by use of the two communication bands that are Band A and Band B, the operation being performed for each of the communication bands. In this case, it is assumed that only a primary channel (PCH) is used for communication performed in each communication band.

For example, it is assumed that a certain transmission terminal performs a backoff on a PCH of Band A, and acquires a transmission right at a time T301. Here, when the transmission terminal tries to perform carrier-aggregation transmission using a channel of Band B, and when another communication is being performed using a PCH of Band B (hereinafter also referred to as "being busy" or "being in a busy state"), as illustrated in FIG. 3, the transmission terminal is not allowed to start performing carrier-aggregation transmission at this point.

Under these circumstances, the transmission terminal has no option but to await data transmission until the transmission terminal acquires anew a transmission right in Band B, or to give up using carrier aggregation to transmit data only using Band A.

In the former method, there is an increase in an overhead due to the wasted time of awaiting transmission, and this results in a reduction in the efficiency in carrier-aggregation communication, and thus in difficulty in obtaining an effect of enhancing throughput. In the example illustrated in FIG. 3, the PCH of Band B is no longer busy at a time T302, a backoff is restarted to acquire a transmission right at a time T303, and then, data transmission (data Tx) using carrier aggregation by use of the respective PCHs of Band A and Band B is started. Thus, the transmission terminal has to await transmission on the PCH of Band A from the time T301 at which a transmission right is acquired on the PCH of Band A to the time T303 at which a backoff is terminated on the PCH of Band B.

On the other hand, in the latter method, there is a reduction in the opportunity of transmission using carrier aggregation. In particular, there is a possibility that transmission using carrier aggregation will not be performed at all in a congestion environment in which there exists a large number of terminals.

Thus, a technology that minimizes an overhead due to awaiting transmission in order to enhance throughput in a wireless LAN, and increases the opportunity of transmission using carrier aggregation, is proposed herein below. The technology proposed herein enables a communication terminal to dynamically select an idle channel in a certain communication band when the communication terminal acquires a transmission right in another communication band, and to perform carrier-aggregation communication. When the communication terminal acquires a transmission right on a primary channel of one of communication bands, and when a primary channel of another of the communication bands is busy, the communication terminal will select an idle secondary channel of the other of the communication bands if there is such a secondary channel, and applies carrier aggregation using both of the communication bands.

First Embodiment

Figure 4:
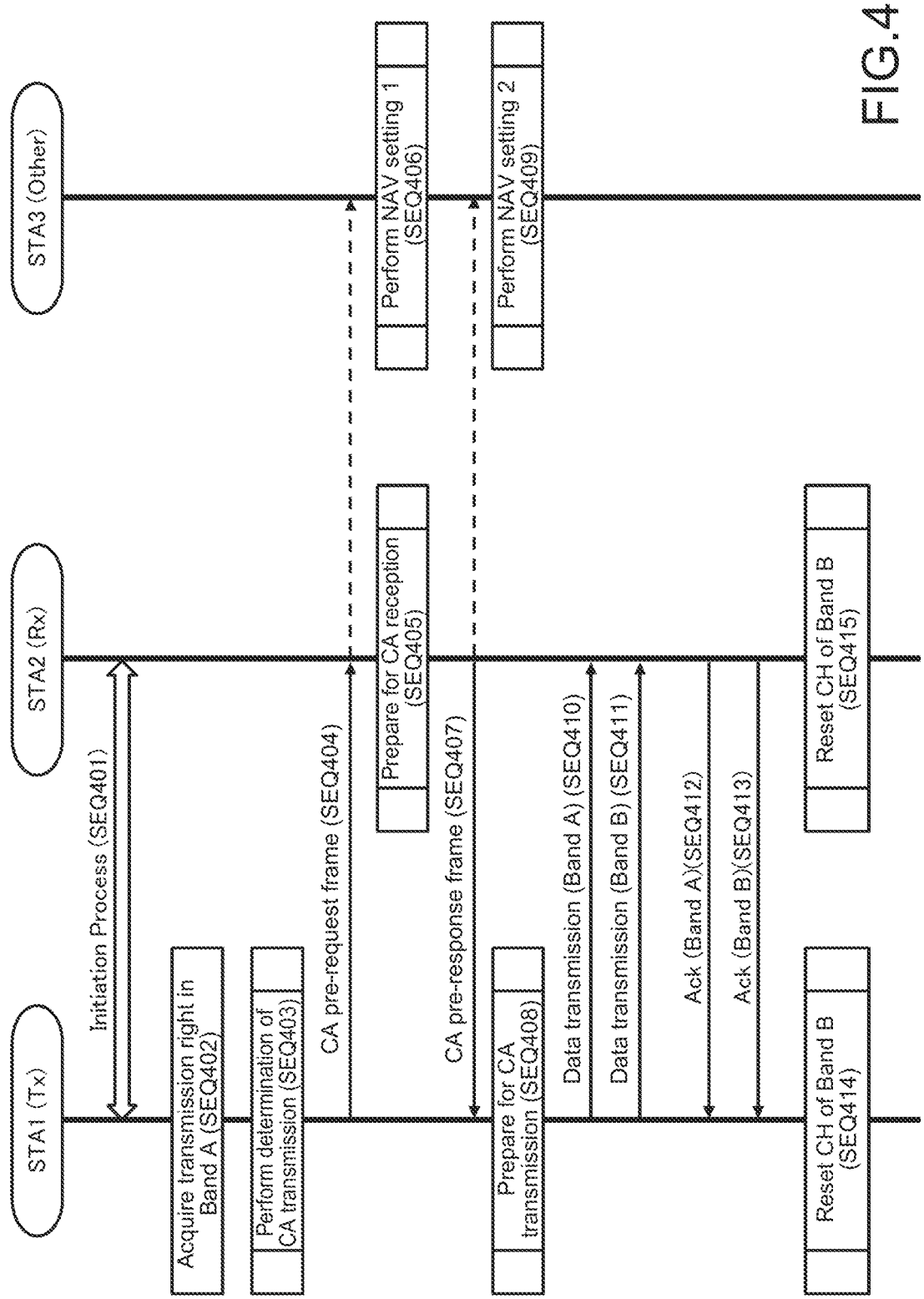
FIG. 4 illustrates an example (a first embodiment) of a communication sequence performed by applying the technology proposed herein.

FIG. 4 illustrates an example of a communication sequence performed by applying the technology proposed herein. It is assumed that STA1 is a data-transmission terminal (Tx), STA2 is a data-reception terminal (Rx), and STA3 is another terminal (Other) that is not involved in data transmission. Further, the figure illustrates a flow of STA1 performing communication using carrier aggregation by use of an idle channel of Band B when STA1 acquires a transmission right on a PCH of Band A. Further, the figure also illustrates a flow of a surrounding communication terminal STA3 setting a state of awaiting transmission (network allocation vector: NAV) for at least one of Band A and Band B, the surrounding communication terminal STA3 communicating with neither STA1 nor STA2.

First, STA1 and STA2 perform an initiation process to exchange, with each other, capability information regarding their own capabilities, and band information to be transmitted (SEQ401). The initiation process may be performed using a PCH of Band A, or using a channel other than the PCH in Band A, or a communication band other than Band A.

The capability information includes information indicating in which frequency band STA1 and STA2 can each perform communication, and information regarding whether transmission and reception using carrier aggregation can be performed. The initiation process does not necessarily have to be performed every time carrier-aggregation communication is performed. For example, first, connection between STA1 and STA2 may be established, and then, STA1 and STA2 may exchange information when there is a change in their communication states. It is assumed that, in the example of the communication sequence illustrated in FIG. 4, STA1 and STA2 have made a commitment to use carrier aggregation by performing the initiation process.

When STA1 acquires a transmission right on the PCH of Band A (SEQ402), STA1 performs processing of determination of carrier-aggregation (CA) transmission (SEQ403). Specifically, STA1 determines whether a PCH of Band B is idle. When the PCH of Band B has been determined to not be idle, STA1 transmits a CA pre-request frame using the PCH of Band A, on the basis of a result of carrier sensing performed by STA1, the CA pre-request frame indicating at least one idle clear channel other than the PCH in Band B (SEQ404). For example, when STA1 performs carrier sensing on a plurality of channels (secondary channels (SCHs)) including a PCH at the same time, at least one clear channel is selected from the SCHs. The processing of determination of CA transmission will be described in detail later (refer to FIG. 6). Further, a frame configuration of a CA pre-request frame will be described in detail later (refer to FIG. 5).

However, when the PCH of Band B is also idle, STA1 starts transmitting data, without any change, using carrier aggregation by use of the respective PCHs of Band A and Band B. This is omitted in FIG. 4. Further, when there is no idle channel in Band B (in the SCHs on which carrier sensing has been performed at the same time as the PCH), STA1 gives up using carrier aggregation and transmits data only using Band A, or awaits transmission until STA1 also acquires a transmission right in Band B to enable carrier aggregation.

When STA2 receives a CA pre-request frame addressed to STA2, STA2 performs processing of preparing for CA reception (SEQ405). Specifically, STA2 compares information regarding a list of a clear channel with a result of carrier sensing performed by STA2, the information regarding a list of a clear channel being included in the received frame. Then, STA2 determines, to be an awaiting channel of Band B, one of channels that are clear channels included in the list information in the CA-pre-request frame and that have also been confirmed to be idle from the result of carrier sensing performed by STA2, and switches the channel. Further, when STA3 receives, on the PCH of Band A, a CA pre-request frame that is not addressed to STA3, STA3 performs NAV setting processing 1 with respect to the PCH of Band A (SEQ406).

Note that the preparation for CA reception and the NAV setting processing 1 will be described in detail later (refer to FIG. 7). Further, a frame configuration of a CA pre-response frame will be described in detail later (refer to FIG. 5).

Thereafter, STA2 transmits a CA pre-response frame to STA1 using the PCH of Band A, the CA pre-response frame including information related to an awaiting channel for STA2 (SEQ407). When STA1 receives, from STA2, the CA pre-response frame addressed to STA1, STA1 performs processing of preparing for CA transmission (SEQ408). Specifically, STA1 switches the channel of Band B to a clear channel (an SCH) specified in channel list information included in the received frame, and prepares for data communication using carrier aggregation. On the other hand, when STA3 receives the CA pre-response frame that is not addressed to STA3, STA3 performs NAV setting processing 2 on a channel of Band B that is given in the received frame (SEQ409). Note that the preparation for CA transmission and the NAV setting processing 2 will be described in detail later (refer to FIG. 8).

Then, STA1 transmits data using carrier aggregation by use of Band A and Band B (SEQ410 and SEQ411). In response to this, STA2 returns an acknowledgment (ack) in each of the communication bands that are Band A and Band B (SEQ412 and SEQ413).

After the carrier-aggregation communication between STA1 and STA2 is completed, as described above, STA1 and STA2 each reset the channel for use in Band B to the PCH (from the SCH used to perform the carrier-aggregation communication) (SEQ414 and SEQ415), and the processing is terminated.

In SEQ407 of FIG. 4, a CA pre-response frame is transmitted by STA2 only using (the PCH of) Band A. However, for example, the CA pre-response frame may be transmitted using a channel (an SCH) used after switching of the channel of Band B. Accordingly, for example, an NAV is set by a terminal that belongs to another BSS (other BSS: OBSS) and constantly uses a channel used after switching of the channel of Band B. This makes it possible to avoid collision in data communication using carrier aggregation.

Figure 5:
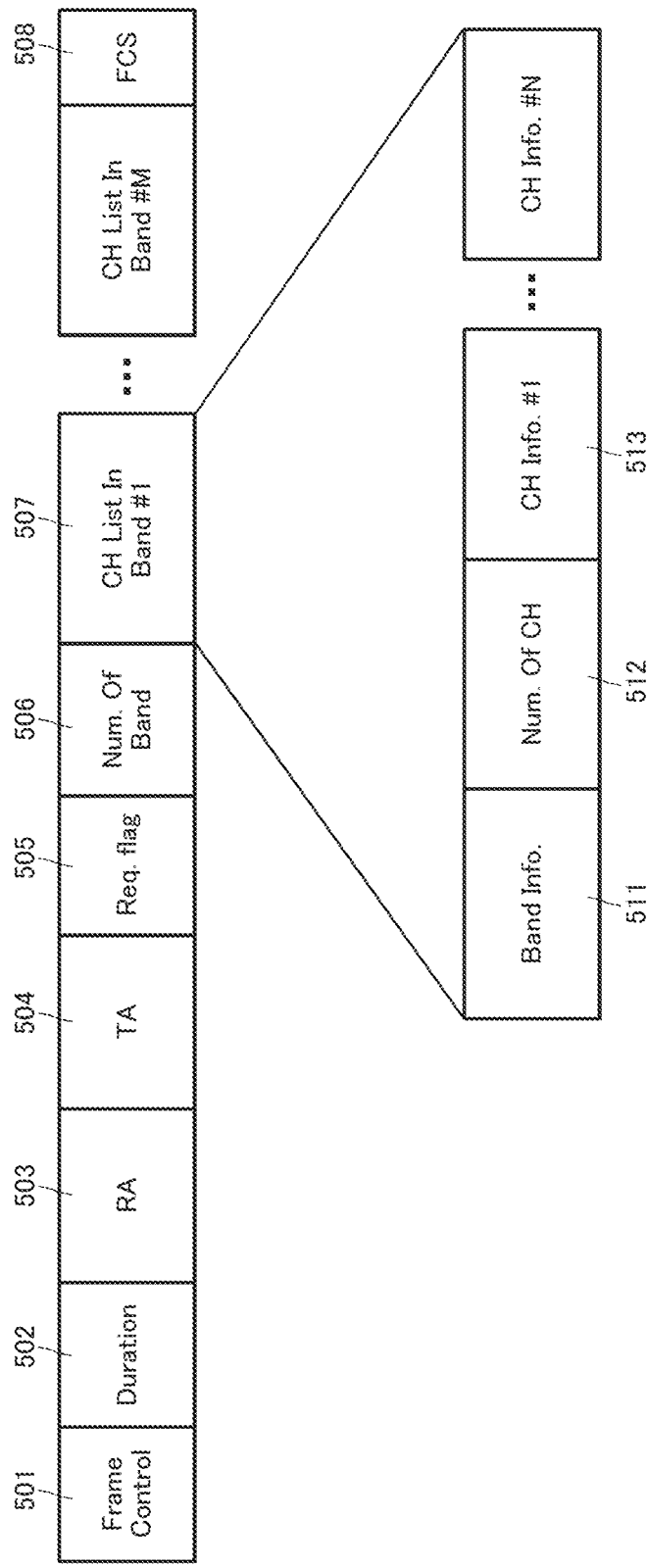
FIG. 5 illustrates an example of a format of a CA pre-request frame and a CA pre-response frame.

FIG. 5 illustrates an example of a format of a CA pre-request frame and a CA pre-response frame. The illustrated frame format is obtained by defining an index of a "Frame Control" field indicating a new frame type with reference to a format of an IEEE 802.11 action frame.

"Frame Control" denoted by reference numeral 501 is a field that includes information indicating the type of action frame.

"Duration" denoted by reference numeral 502 is a field that includes time information regarding the time elapsed before a subsequent carrier-aggregation communication is completed. A surrounding terminal that does not perform communication reads a value of this field to set an NAV.

"Receiver Address (RA)" denoted by reference numeral 503 is a field that includes a MAC address of a transmission destination. Further, "Transmitter Address (TA)" denoted by reference numeral 504 is a field that includes a MAC address of a transmission source.

"Req. flag" denoted by reference numeral 505 is a field in which information regarding a flag indicating whether the frame is a "CA pre-request frame" or a "CA pre-response frame", is given. For example, when the flag is assigned "1", this indicates that the frame is a CA pre-request frame, and when the flag is assigned "0", this indicates that the frame is a CA pre-response frame.

"Num. Of Band" denoted by reference numeral 506 is a field in which the number of communication bands used when carrier aggregation is applied, is given.

"CH List In Band" denoted by reference numeral 507 is a field that includes information regarding a channel in a certain communication band (used when carrier aggregation is applied). The frame includes the same number of "CH List In Band" fields as the number given in the "Num. Of Band" field 506. In FIG. 5, M is assumed to be given in the "Num. Of Band" field 506 as the number of communication bands.

The "CH List In Band" field 507 includes a "Band Info." field 511 that indicates a communication band, a "Num. Of CH" field 512 in which the number of channels in the communication band indicated by the "Band Info." field 511, is given, and a "CH Info." field 513 in which channel information is given. The "CH List In Band" field 507 includes the same number of "CH Info." fields 513 as the number given in the "Num. Of CH" field. The CA pre-request frame includes the same number of "CH Info." fields 513 as the number of candidate channels for each communication band, whereas the CA pre-response frame only includes one "CH Info." field in the "CH List In Band" field 507.

Specifically, a transmission terminal that transmits data using carrier aggregation gives, to the "Band Info." field 511 of a CA pre-request frame, information regarding a communication band (Band B) used together with a communication band (Band A) when the carrier aggregation is applied, the communication band (Band A) being used to transmit the CA pre-request frame. The transmission terminal gives, to the "Num. Of CH" field 512 of the CA pre-request frame, the number of candidate channels (SCHs) confirmed by the transmission terminal itself to be idle in the communication band used to apply the carrier aggregation. The transmission terminal gives, to each "CH Info." field 513 of the CA pre-request frame, information that indicates a corresponding one of the candidate channels. In FIG. 5, the communication band is assumed to include N candidate channels. On the other hand, a reception terminal that returns a CA pre-response frame gives, to the "CH Info." field 513 of the CA pre-response frame, information that indicates one channel selected for carrier aggregation by the reception terminal from the candidate channels given in the "CH List In Band" field 507 of the CA pre-request frame.

Here, values given in the "Band Info." field 511 and the "CH Info." field 513 are not particularly limited as long as the values are identifiers shared by the respective communication terminals STA1, STA2, and STA3. For example, the operating class given in Annex E of IEEE 802.11-2016 may be used as "Band Info." and a channel number in the channel set given in Annex E of IEEE 802.11-2016 may be used as "CH Info".

"Frame Check Sequence (FCS)" denoted by reference numeral 508 is a field in which a code of correcting an error in the entire frame is given.

Figure 6:
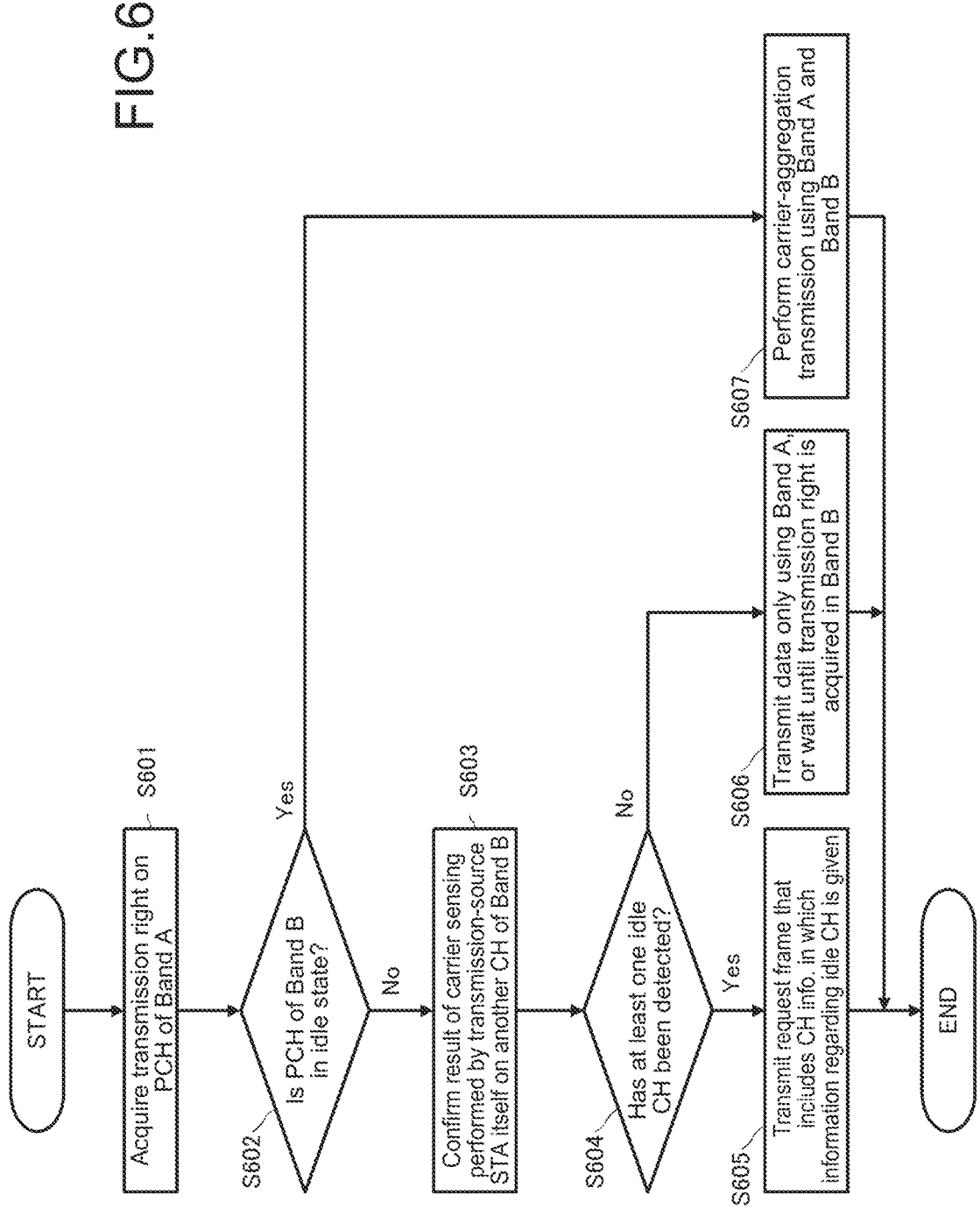
FIG. 6 is a flowchart of a detailed procedure of processing of determination of CA transmission.

FIG. 6 illustrates a detailed procedure of processing of determination of CA transmission in the form of a flowchart, the processing of determination of CA transmission being performed by STA1 (or by a data-transmission terminal) in SEQ403 in the communication sequence illustrated in FIG. 4.

After STA1 acquires a transmission right on a PCH of Band A (Step S601), STA1 confirms whether a PCH of Band B is idle (Step S602).

Here, when it has been determined that the PCH of Band B is idle (Yes in Step S602), STA1 starts performing communication using carrier aggregation by use of the PCHs of Band A and Band B (Step S607). In this case, for example, STA1 may perform a request-to-send/clear-to-send (RTS/CTS) communication before STA1 starts data communication, in order to avoid collision. Further, both Band A and Band B may be made broader to start data transmission.

On the other hand, when it has been determined that the PCH of Band B is busy (No in Step S602), STA1 confirms a result of carrier sensing performed on a channel other than the PCH in Band B (Step S603). The channel other than the PCH is, for example, an SCH on which carrier sensing has been performed by STA1 at the same time as the PCH.

When STA1 has detected at least one idle channel in Band B (Yes in Step S604), STA1 generates a CA pre-request frame (refer to FIG. 5) that includes the "CH List In Band" field 507 including the "Band Info" field 511 indicating Band B, the "Num. Of Band" field 512 in which the number of channels detected as being idle is given, and the "CH Info." field 513 in which information regarding a channel detected as being idle is given, and transmits the generated frame to STA2 using the PCH of Band A (Step S605). The determination in Step S604 is assumed to be Yes in the communication sequence illustrated in FIG. 4.

Further, when STA1 has detected no idle channel in Band B (No in Step S604), STA1 gives up using carrier aggregation and starts performing a normal communication only using the PCH of Band A, or awaits data transmission using carrier aggregation until STA1 acquires a transmission right in Band B (Step S606).

Note that how carrier sensing is performed by, for example, STA1 is not limited. Specifically, a channel in which a constant level of power has not been detected during an interval of point coordination function (PCF) interframe space (PIFS) (25 microseconds) may be detected as being idle according to, for example, a method for performing carrier sensing on a secondary channel that is defined in IEEE 802.11. Further, when a transmission terminal includes wireless communication apparatuses for a plurality of communication bands, different channels may be set in the respective wireless communication apparatuses, and a channel in which a preamble has not been detected during a back-off period may be detected as being idle.

Further, when there are at least three bands used when carrier aggregation is applied, STA1 confirms, in Step S603, a result of carrier sensing for each band, and transmits, in Step S605, a CA pre-request frame that includes information related to a plurality of candidate channels for each communication band (that is, includes a plurality of "CH List In Band" fields).

Figure 7:
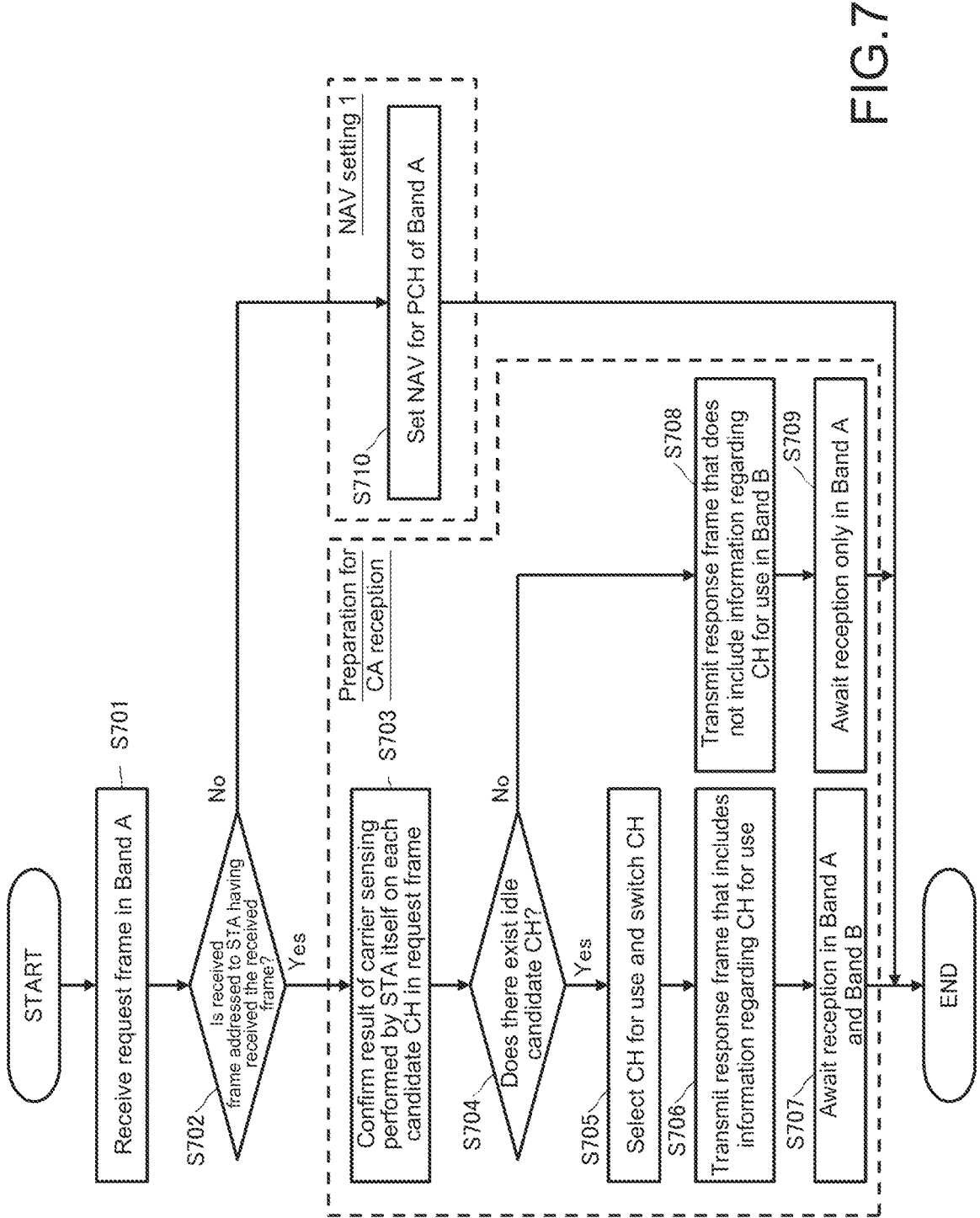
FIG. 7 is a flowchart of detailed procedures of processing of preparing for CA reception and an NAV setting.

FIG. 7 illustrates detailed procedures of processing of preparing for CA reception and an NAV setting in the form of a flowchart, the processing of preparing for CA reception and the NAV setting being respectively performed by STA2 and STA3 (or by a data-reception terminal and another terminal that is not involved in data transmission) in SEQ405 and SEQ406 in the communication sequence illustrated in FIG. 4.

When a STA receives a CA pre-request frame transmitted through Band A by another terminal (for example, STA1) that intends to transmit data using carrier aggregation (Step S701), the STA determines, using the "RA" field, whether the frame is addressed to the STA (Step S702).

When it has been determined that the received CA pre-request frame is addressed to the STA (Yes in Step S702), the process moves on to CA reception processing (the case in which the STA is STA2 in the example of the communication sequence illustrated in FIG. 4). Further, when it has been determined that the received CA pre-request frame is not addressed to the STA (No in Step S702), the process moves on to NAV setting processing 1 (the case in which the STA is STA3 in the example of the communication sequence illustrated in FIG. 4). The processes are described below in the order described above.

First, the CA reception processing performed by STA2 is described. After STA2 receives the CA pre-request frame addressed to STA2 from STA1 (Yes in Step S702), STA2 confirms a result of carrier sensing performed by STA2 on each candidate channel included in the "CH List In Band" field 507 indicating Band B (Step S703).

Here, when there is at least one channel, from among the candidate channels in the "CH List In Band" field 507, that has also been detected by STA2 as being idle (Yes in Step S704), STA2 selects a channel used for carrier-aggregation communication from the detected channels, and switches the channel of Band B from the PCH to the selected channel (Step S705).

Then, STA2 transmits a CA pre-response frame to a transmission source of the CA pre-request frame, the CA pre-response frame including the "Band Info." field 511 in which information regarding Band B is given, and the "CH Info." field 513 in which information regarding the selected channel is given (Step S706). Note that only one CH Info. is included in the "CH List In Band" field 507 of the CA pre-response frame since only one channel used for carrier aggregation in Band B is specified in the CA pre-response frame with respect to the CA pre-request frame.

Thereafter, STA2 awaits reception on the PCH of Band A and the selected channel of Band B (Step S707). The determination in Step S704 is assumed to be Yes in the communication sequence illustrated in FIG. 4.

On the other hand, when none of the channels given in the list have been detected by STA2 as being idle (No in Step S704), STA2 transmits, to STA1, a CA pre-response frame that does not include the "CH List In Band" field 507 indicating Band B (Step S708). In this case, STA1 receives the CA-pre-response frame, and can detect that Band B is not allowed to be used for carrier aggregation. Thereafter, STA2 awaits reception only on the PCH of Band A (Step S709).

Note that, in Step S705, a method for selecting, by STA2, a channel for use from a plurality of candidate channels is not particularly limited. For example, the levels of interference and noise may be measured while performing carrier sensing, and a channel with lowest levels of interference and noise may be selected. Further, when there are at least three bands used when carrier aggregation is applied, STA2 confirms, for each band, a result of carrier sensing performed on each channel in a list included in the CA pre-request frame from STA1, selects one channel for each band, and transmits, to STA1, a CA pre-request frame that includes a plurality of "CH List In Band" fields).

Next, the NAV setting processing 1 is described. After STA3 receives, from STA1, the CA pre-request frame that is not addressed to STA3 (No in Step S702), STA3 reads information given in "Duration" in the frame, and sets an NAV for the PCH of Band A (Step S710). This makes it possible to suppress transmission in order to avoid collision in data communication expected to be performed between STA1 and STA2 using the PCH of Band A.

Figure 8:
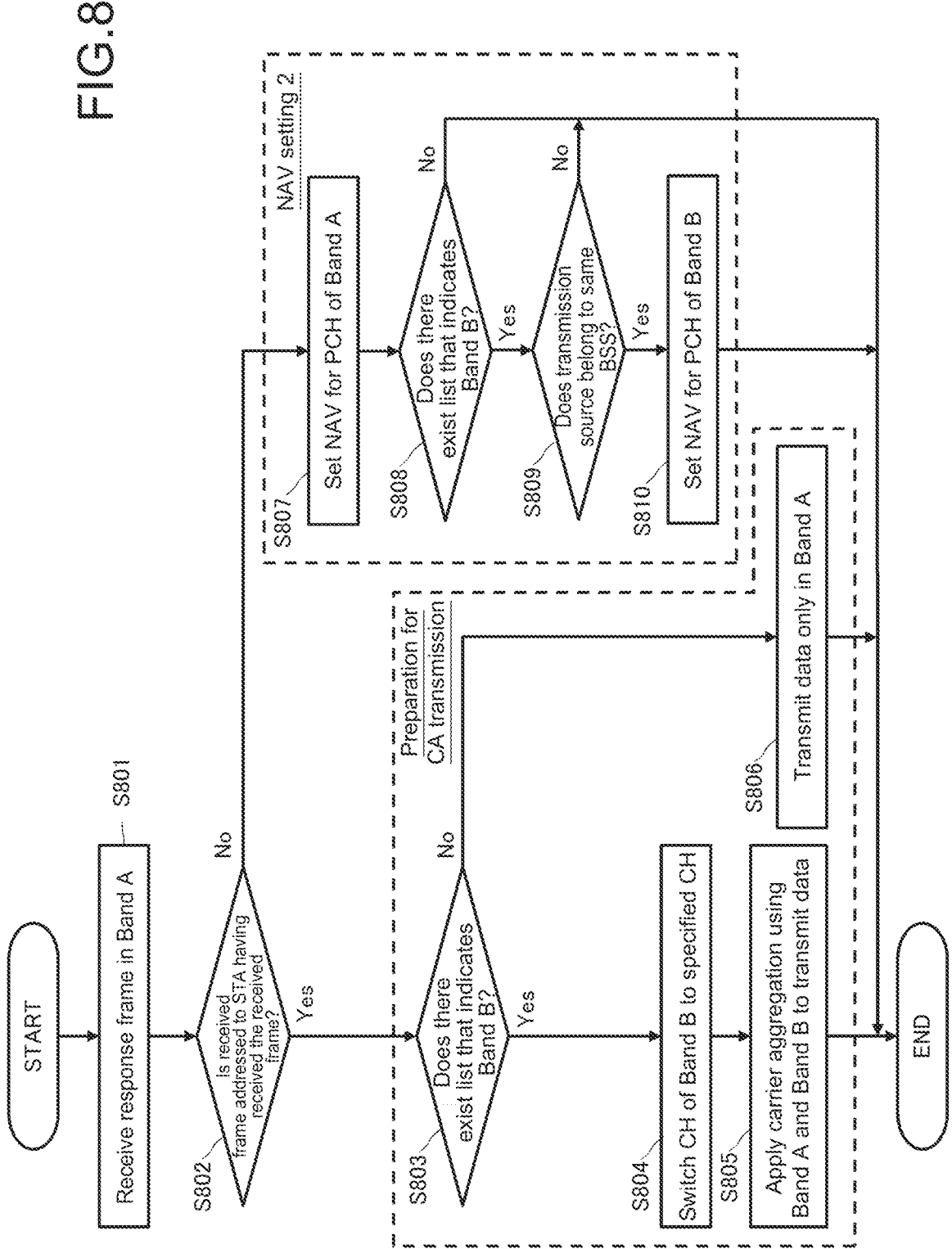
FIG. 8 is a flowchart of detailed procedures of processing of preparing for CA transmission and an NAV setting.

FIG. 8 illustrates detailed procedures of processing of preparing for CA transmission and an NAV setting in the form of a flowchart, the processing of preparing for CA transmission and the NAV setting being respectively performed by STA1 and STA3 (or by a data-transmission terminal and another terminal that is not involved in data transmission) in SEQ408 and SEQ409 in the communication sequence illustrated in FIG. 4.

When a STA receives a CA pre-response frame transmitted through Band A by STA2 (Step S801), the STA determines, using the "RA" field, whether the frame is addressed to the STA (Step S802).

When it has been determined that the received CA pre-response frame is addressed to the STA (Yes in Step S802), the process moves on to CA transmission processing (the case in which the STA is STA1 in the example of the communication sequence illustrated in FIG. 4). Further, when it has been determined that the received CA pre-response frame is not addressed to the STA (No in Step S802), the process moves on to NAV setting processing 2 (the case in which the STA is STA3 in the example of the communication sequence illustrated in FIG. 4). The processes are described below in the order described above.

First, the processing of preparing for CA transmission that is performed by STA1 is described. When STA1 acquires the CA pre-response frame addressed to STA1 from STA2 (Yes in Step S802), STA1 confirms the "CH List In Band" field 507 in the frame (Step S803).

Here, when the received CA pre-response frame includes the "CH List In Band" field 507 indicating Band B (Yes in Step S803), STA1 switches the channel of Band B to a channel indicated by the "CH Info." field 513 in the "CH List In Band" field 507 (Step S804). Then, STA1 applies carrier aggregation using Band A and Band B by use of the PCH of Band A and the channel of Band B after the switching, and starts data communication (Step S805). The determination in Step S803 is assumed to be Yes in the communication sequence illustrated in FIG. 4.

On the other hand, when the "CH List In Band" field 507 indicating Band B is not included (No in Step S803), STA1 gives up transmitting data using carrier aggregation, and starts transmitting data only using the PCH of Band A (Step S806).

Here, when STA1 has acquired information regarding a channel detected as being idle in the surroundings of the specified channel of Band B, STA1 may transmit data, in Step S806, using a broadband channel obtained by integrating the surrounding channels.

When there are at least three bands used when carrier aggregation is applied, STA1 starts data communication using carrier aggregation only using communication bands included in the corresponding "CH List in Band" fields 507.

Next, the NAV setting processing 2 is described. When STA3 receives, from STA2, the CA pre-response frame that is not addressed to STA3 (No in Step S802), first, STA3 sets an NAV for the PCH of Band A on the basis of information given in "Duration" in the received frame, as in the case of the NAV setting processing 1 (Step S807).

Thereafter, STA3 determines whether the received CA pre-response frame includes the "CH List In Band" field 507 indicating Band B (Step S808). Further, when it has been determined that the "CH List In Band" field 507 indicating Band B is included (Yes in Step S808), STA3 further determines whether STA2, which is a transmission source, belongs to the same BSS as STA 3 with respect to Band B (Step S809).

When it has been determined that STA3 belongs to the same BSS as STA2 (Yes in Step S809), STA3 also sets an NAV for the PCH of Band B (Step S810). Even if the state of the PCH of Band B is changed from a busy state to an idle state, data will be communicated between STA1 and STA2 after switching of the channel of Band B is performed. Thus, the setting of an NAV results in preventing STA3 from unnecessarily starting data transmission.

Further, when it has been determined that the "CH List In Band" field 507 indicating Band B is not included (No in Step S808), STA3 does not have to set an NAV for Band B, and thus this processing is terminated at this point.

Figure 9:
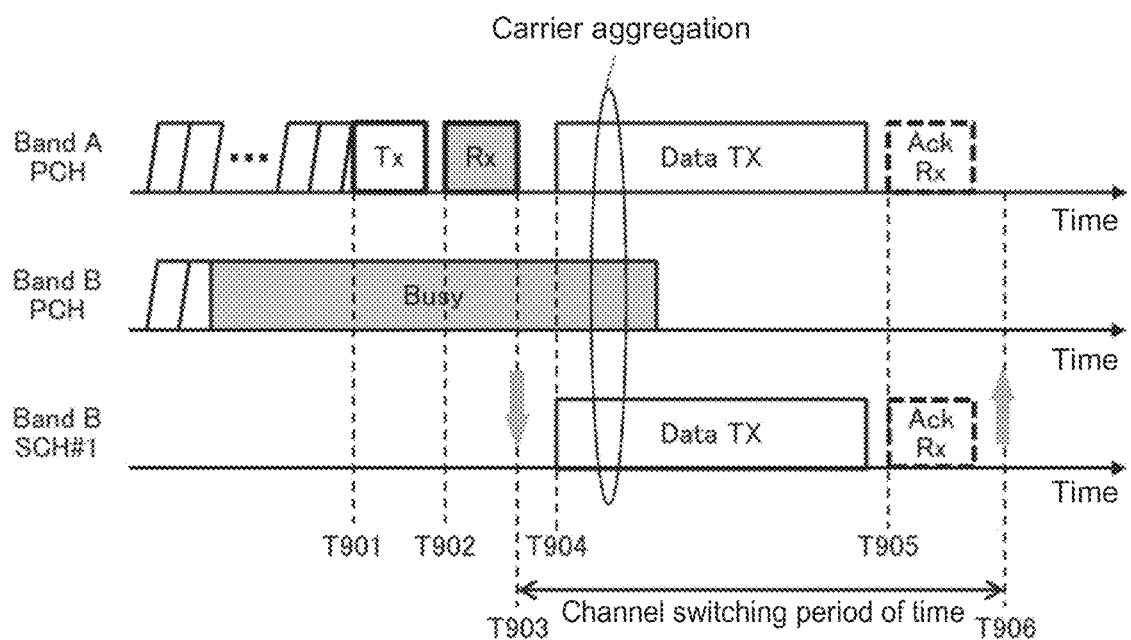
FIG. 9 illustrates an example of an operation for each communication band when data is transmitted using carrier aggregation by use of two communication bands that are Band A and Band B (the first embodiment).

FIG. 9 illustrates an example of an operation for each communication band when a transmission terminal transmits data using carrier aggregation by use of two communication bands that are Band A and Band B in the present embodiment. In this case, it is assumed that the channel of a communication band in which a primary channel (PCH) is busy is switched to an idle secondary channel (SCH) (or an idle channel other than the PCH) to apply carrier aggregation.

For example, it is assumed that a certain transmission terminal performs a backoff on the PCH of Band A, and acquires a transmission right at a time T901. When the PCH of Band B is busy at this point, the transmission terminal has no option but to await transmission until the PCH of Band B becomes idle, or to give up performing communication using carrier aggregation in the example illustrated in FIG. 3. On the other hand, in the present embodiment, when the transmission terminal detects a clear channel other than the PCH in Band B (SCH #1, which is one of the secondary channels of Band B in the example illustrated in FIG. 9) on the basis of a result of carrier sensing performed by the transmission terminal on Band B, the transmission terminal transmits a CA pre-request frame to a reception terminal using the PCH of Band A at the time T901, the CA pre-request frame including the "CH Info." field 513 for Band B in which information regarding SCH #1 is given.

When the reception terminal also confirms that SCH #1 of Band B is idle, the reception terminal temporarily switches the channel for use in Band B from the PCH to SCH #1, and returns a CA pre-response frame using the PCH of Band A at a time T902, the CA pre-response frame including the "CH Info." field 513 in which information regarding SCH #1 is given. Then, the reception terminal awaits data reception in Band A and Band B.

When the transmission terminal confirms, from the received CA pre-response frame, that SCH #1 of Band B is also idle for the reception terminal, the transmission terminal switches the channel for use in Band B from the PCH to SCH #1 at a time T903. Then, at a time T904, the transmission terminal transmits data (Data Tx) using carrier aggregation by use of the two communication bands that are Band A and Band B. In other words, when the PCH of Band B is busy, the transmission terminal can also apply carrier aggregation by switching the channel of Band B to SCH #1 in an idle state.

The reception terminal awaits data reception on the PCH of Band A and on SCH #1 of Band B. Thus, the reception terminal can receive data transmitted using carrier aggregation. When the reception terminal successfully receives data, the reception terminal transmits acknowledgment frames (acks) at a time T905 respectively using the respective communication bands that are Band A and Band B.

Further, when the transmission terminal receives the acknowledgment frames (acks) from the reception terminal at the time T905 respectively using the respective communication bands that are Band A and Band B, the transmission terminal subsequently resets the channel for use in Band B to the PCH from SCH #1 at a time T906. Thus, for the transmission terminal, the period of time from the time T903 to the time T906 is a "channel switching period of time" in which the channel for use in Band B has been switched to SCH #1 from the PCH.

As described above, in the example of the operation illustrated in FIG. 9, a CA pre-request frame and a CA pre-response frame are exchanged between a transmission terminal and a reception terminal to negotiate a channel that is to be temporarily used upon performing carrier-aggregation communication. This makes it possible to efficiently perform communication using carrier aggregation.

As in the present embodiment, a transmission terminal and a reception terminal detect a clear channel respectively using a result of carrier sensing performed by the transmission terminal and a result of carrier sensing performed by the reception terminal. This makes it possible to select a channel with which communication can be performed with certainty. Further, a surrounding terminal sets an NAV on the basis of a CA pre-notification frame or a CA pre-response frame. This also makes it possible to prevent a packet collision upon performing carrier-aggregation communication.

According to the first embodiment, a CA pre-request frame and a CA pre-response frame are exchanged between a transmission terminal and a reception terminal to negotiate a channel that is to be temporarily used upon performing carrier-aggregation communication. This makes it possible to efficiently perform communication using carrier aggregation.

Further, a clear channel is detected using both a result of carrier sensing performed by the transmission terminal and a result of carrier sensing performed by the reception terminal. This makes it possible to select a channel with which communication can be performed with certainty. Further, a surrounding terminal sets an NAV on the basis of the CA pre-request frame or the CA pre-response frame. This makes it possible to prevent a packet collision upon performing carrier-aggregation communication.

Second Embodiment

The example in which a transmission terminal and a reception terminal detect a channel used for carrier aggregation, respectively using a result of carrier sensing performed by the transmission terminal and a result of carrier sensing performed by the reception terminal, has been described in the first embodiment. On the other hand, an example in which a transmission terminal uniquely selects a channel and a reception terminal uses the specified channel, is described in a second embodiment. Compared with the first embodiment, the second embodiment makes it possible to reduce an amount of processing performed by the reception terminal, although the second embodiment results in difficulty in selecting an effective channel with certainty. Thus, the second embodiment is effective when, for example, STA1, which is a transmission terminal, is an AP, and STA2, which is a reception terminal, is a non-AP STA.

Figure 10:
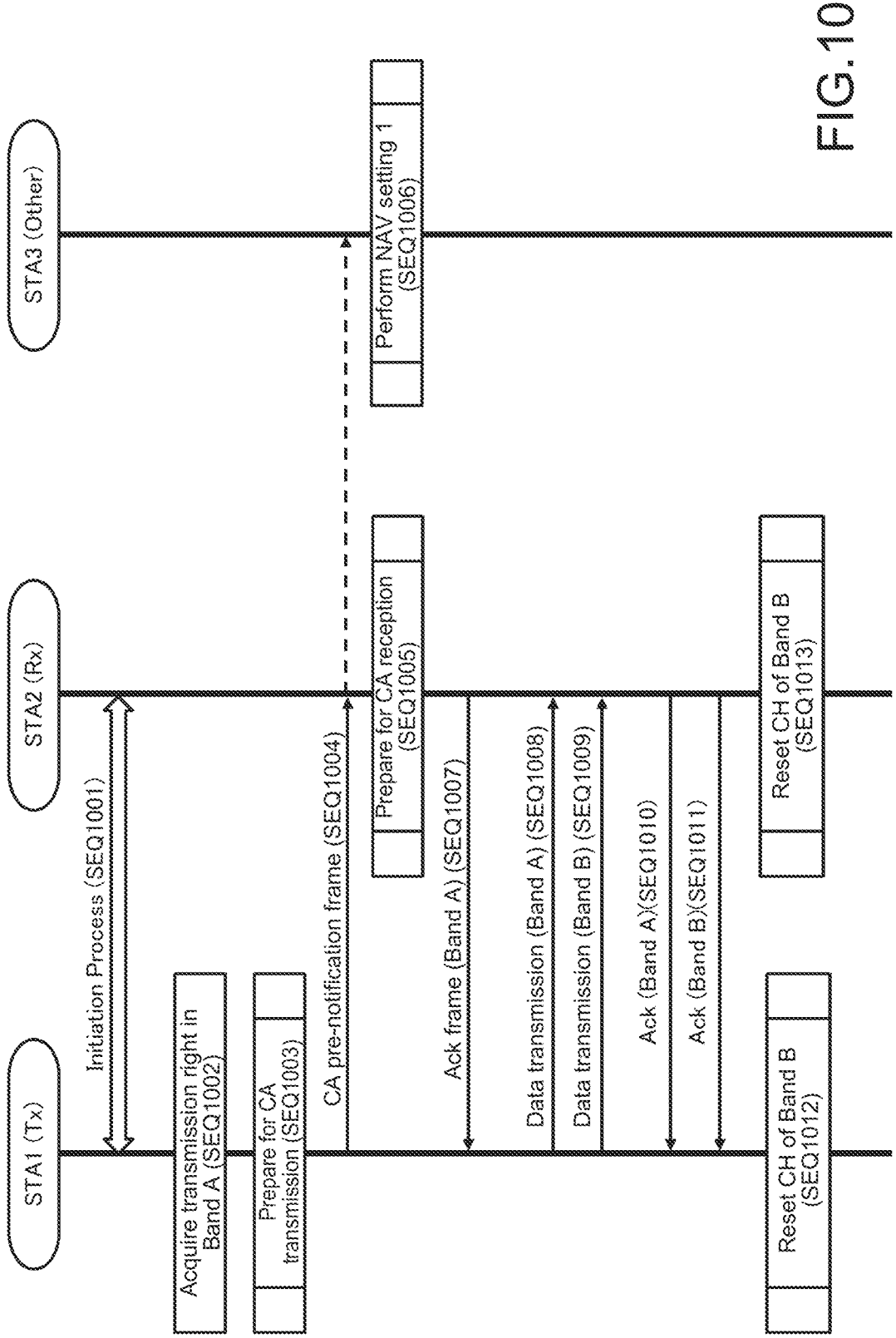
FIG. 10 illustrates an example (a second embodiment) of a communication sequence performed by applying the technology proposed herein.

FIG. 10 illustrates an example of a communication sequence performed by applying the technology proposed herein (the second embodiment). It is assumed that STA1 is a data-transmission terminal (Tx), STA2 is a data-reception terminal (Rx), and STA3 is another terminal (Other) that is not involved in data transmission. Further, the figure illustrates a flow of STA1 performing communication using carrier aggregation by uniquely specifying a clear channel of Band B (or a channel used for carrier aggregation) when STA1 acquires a transmission right on a PCH of Band A. Further, the figure also illustrates a flow of a surrounding communication terminal STA3 setting an NAV for at least one of Band A and Band B, the surrounding communication terminal STA3 communicating with neither STA1 nor STA2.

First, STA1 and STA2 perform an initiation process to exchange, with each other, capability information regarding their own capabilities, and band information to be transmitted (SEQ1001). The initiation process may be performed using a PCH of Band A, or using a channel other than the PCH in Band A, or a communication band other than Band A.

The capability information includes information indicating in which frequency band STA1 and STA2 can each perform communication, and information regarding whether transmission and reception using carrier aggregation can be performed. The initiation process does not necessarily have to be performed every time carrier-aggregation communication is performed. For example, first, connection between STA1 and STA2 may be established, and then, STA1 and STA2 may exchange information when there is a change in their communication states. It is assumed that, in the example of the communication sequence illustrated in FIG. 10, STA1 and STA2 have made a commitment to use carrier aggregation by performing the initiation process.

When STA1 acquires a transmission right on the PCH of Band A (SEQ1002), STA1 prepares for CA transmission (SEQ1003). As the preparation for CA transmission, STA1 performs a determination of an SCH for use in Band B. Specifically, STA1 determines whether a PCH of Band B is idle. When the PCH of Band B has been determined to not be idle, STA1 selects, on the basis of a result of carrier sensing performed by STA1, a channel (an SCH) that is to be used for carrier aggregation from at least one idle clear channel other than the PCH in Band B, and switches the channel of Band B to the selected channel to prepare for data communication performed using carrier aggregation. Next, STA1 transmits a CA pre-notification frame using the PCH of Band A, the CA pre-notification frame including a channel for use in Band B when carrier aggregation is applied (SEQ1004). The processing of preparing for CA transmission will be described in detail later (refer to FIG. 12). Further, a frame configuration of a CA pre-notification frame will be described in detail later (refer to FIG. 11).

However, when the PCH of Band B is also idle, STA1 starts transmitting data, without any change, using carrier aggregation by use of the respective PCHs of Band A and Band B. This is omitted in FIG. 10. Further, when there is no idle channel in Band B (in the SCHs on which carrier sensing has been performed at the same time as the PCH), STA1 gives up using carrier aggregation and transmits data only using Band A, or awaits transmission until STA1 also acquires a transmission right in Band B to enable carrier aggregation.

When STA2 receives a CA pre-notification frame addressed to STA2, STA2 performs processing of preparing for CA reception (SEQ1005). Specifically, STA2 determines, to be an awaiting channel of Band B, the channel (SCH) of Band B that is specified in the received frame, and switches the channel. Further, STA2 transmits an ack frame for the CA-pre-notification frame to STA1 using the PCH of Band A (SEQ1007). Furthermore, when STA3 receives, on the PCH of Band A, a CA pre-notification frame that is not addressed to STA3, STA3 performs NAV setting processing 1 with respect to each of the PCH of Band A and the channel of Band B that is included in the CA pre-notification frame (SEQ1006). The preparation for CA reception and the NAV setting processing 1 will be described in detail later (refer to FIG. 13).

When STA1 receives the acknowledgment (ack) frame for the CA pre-notification frame from STA2, STA1 transmits data using carrier aggregation by use of the PCH of Band A and the clear channel (SCH) of Band B (SEQ1008 and SEQ1009). In response to this, STA2 returns an acknowledgment (ack) in each of the communication bands that are Band A and Band B (SEQ1010 and SEQ1011).

After the carrier-aggregation communication between STA1 and STA2 is completed, as described above, STA1 and STA2 each reset the channel for use in Band B to the PCH (from the SCH used to perform the carrier-aggregation communication) (SEQ1012 and SEQ1013), and the processing is terminated.

In SEQ1007 of FIG. 10, STA2 transmits an ack frame using the PCH of Band A. However, for example, STA2 may also transmit the ack frame using a channel (an SCH) used after switching of the channel of Band B. Accordingly, for example, an NAV is set by a terminal that belongs to another BSS (other BSS: OBSS) and constantly uses a channel used after switching of the channel of Band B. This makes it possible to avoid collision in data communication using carrier aggregation.

Figure 11:
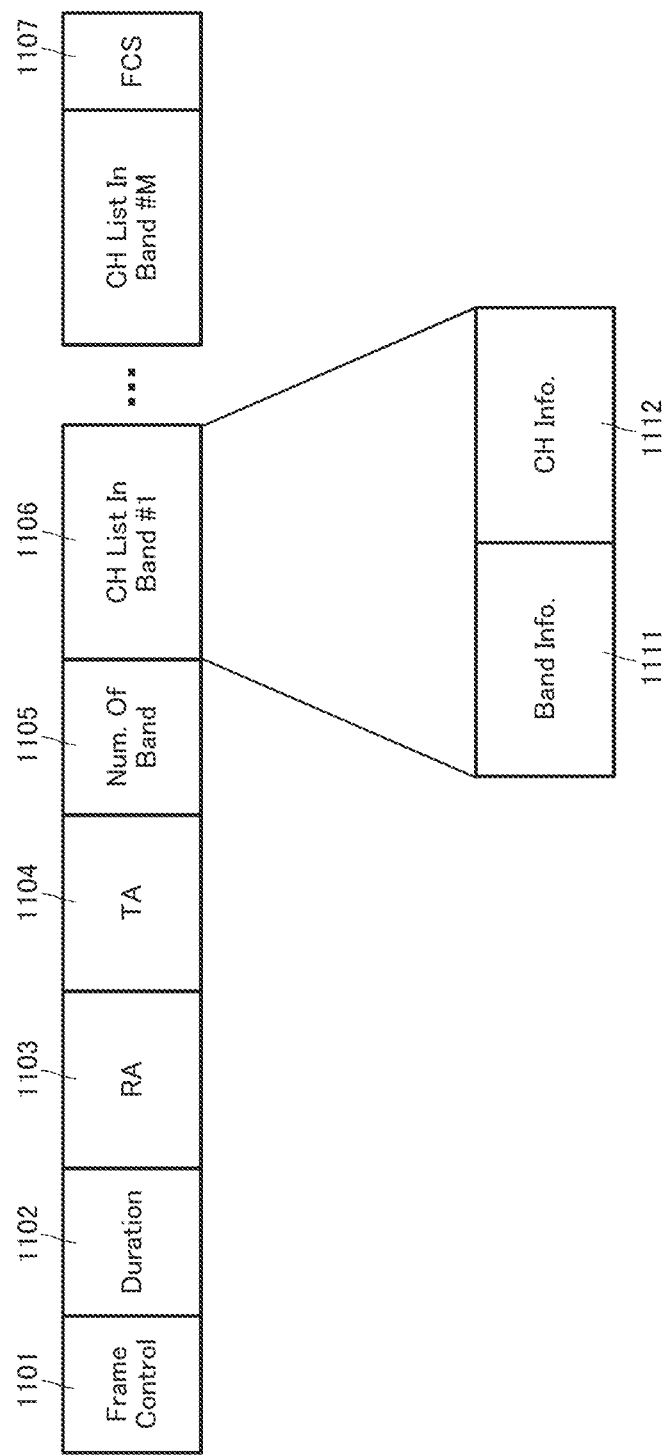
FIG. 11 illustrates an example of a format of a CA pre-notification frame.

FIG. 11 illustrates an example of a format of a CA pre-notification frame. The illustrated frame format is obtained by defining an index of a "Frame Control" field indicating a new frame type with reference to a format of an IEEE 802.11 action frame.

"Frame Control" denoted by reference numeral 1101 is a field that includes information indicating the type of action frame. "Duration" denoted by reference numeral 1102 is a field that includes time information regarding the time elapsed before a subsequent carrier-aggregation communication is completed. A surrounding terminal that does not perform communication reads a value of this field to set an NAV. "RA" denoted by reference numeral 1103 is a field that includes a MAC address of a transmission destination, and "TA" denoted by reference numeral 1104 is a field that includes a MAC address of a transmission source. Note that the frame is only used as a CA pre-notification frame, and is not used as other frames. Thus, there is no need for a flag given in, for example, "Req. flag" field (refer to FIG. 5).

"Num. Of Band" denoted by reference numeral 1105 is a field in which the number of communication bands used when carrier aggregation is applied, is given. "CH List In Band" denoted by reference numeral 1106 is a field that includes information regarding a channel in a certain communication band. The frame includes the same number of "CH List In Band" fields as the number given in the "Num. Of Band" field.

The "CH List In Band" field 1106 includes a "Band Info." field 1111 that indicates a communication band, and a "CH Info." field 1112 in which channel information regarding a channel specified to be used for carrier aggregation in the communication band, is given. In the present embodiment, a transmission terminal specifies, for each communication band, one channel that is to be used for carrier aggregation. Thus, the CA pre-notification frame only includes one "CH Info." field in the "CH List In Band" field 1106.

Specifically, a transmission terminal that transmits data using carrier aggregation gives, to the "Band Info." field 1111 of a CA pre-notification frame, information regarding a communication band (Band B) used together with a communication band (Band A) when carrier aggregation is applied, the communication band (Band A) being used to transmit the CA pre-request frame. The transmission terminal gives, to the "CH Info." field 1112 of the CA pre-notification frame, information that indicates a channel in the communication band (Band B) that is used for aggregation and specified in the "Band Info." field 1111.

Here, values given in the "Band Info." field 1111 and the "CH Info." field 1112 are not particularly limited as long as the values are identifiers shared by the respective communication terminals STA1, STA2, and STA3. For example, the operating class given in Annex E of IEEE 802.11-2016 may be used as "Band Info." and a channel number in the channel set given in Annex E of IEEE 802.11-2016 may be used as "CH Info".

Further, an "FCS" field 1107 in which a code of correcting an error in the entire frame is given, is added to an end of the frame.

Figure 12:
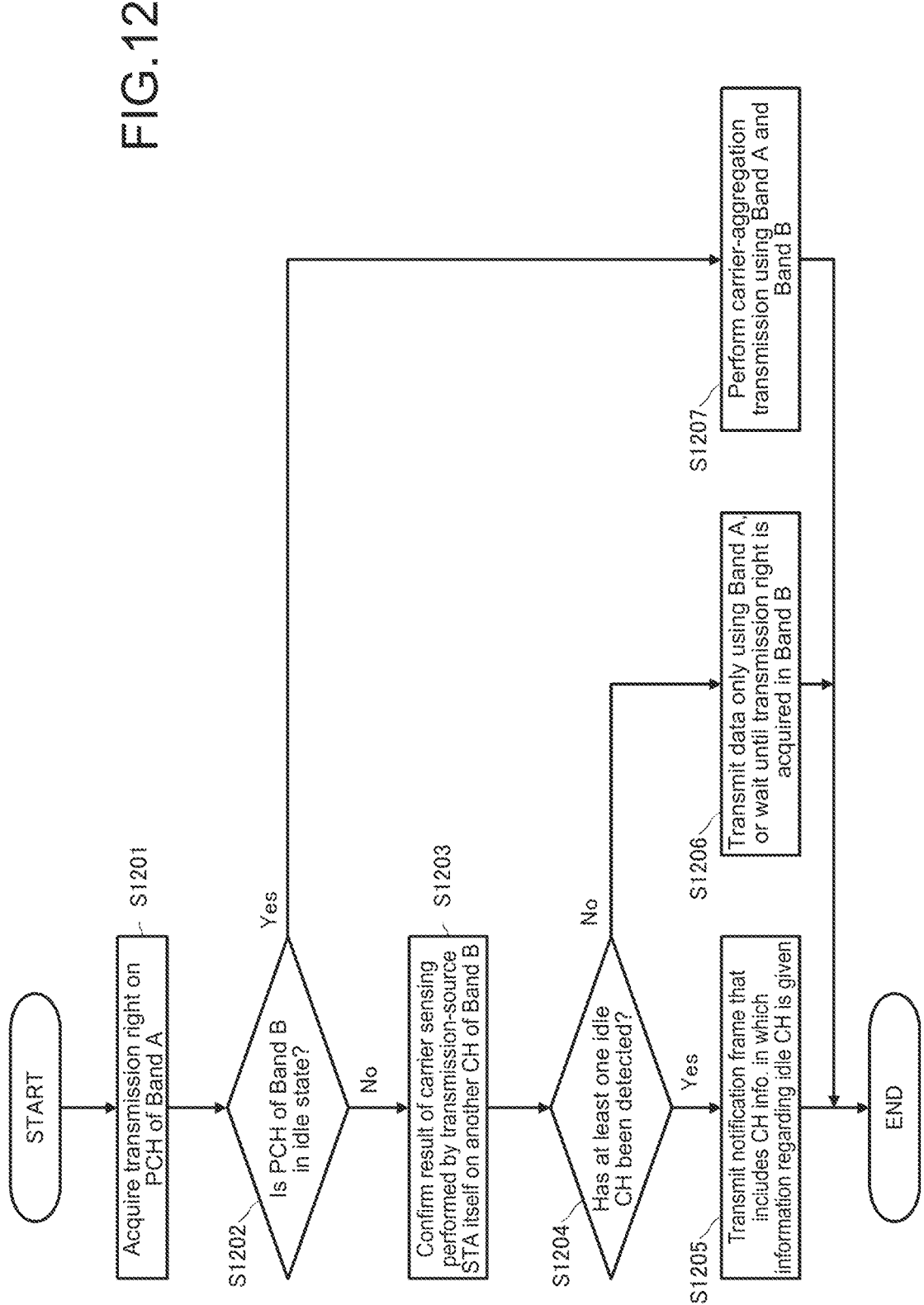
FIG. 12 is a flowchart of a detailed procedure of processing of preparing for CA transmission.

FIG. 12 illustrates a detailed procedure of processing of preparing for CA transmission in the form of a flowchart, the processing of preparing for CA transmission being performed by STA1 (or by a data-transmission terminal) in SEQ1003 in the communication sequence illustrated in FIG. 10.

After STA1 acquires a transmission right on a PCH of Band A (Step S1201), STA1 confirms whether a PCH of Band B is idle (Step S1202).

Here, when it has been determined that the PCH of Band B is idle (Yes in Step S1202), STA1 starts performing communication using carrier aggregation by use of the PCHs of Band A and Band B (Step S1207). In this case, for example, STA1 may perform an RTS/CTS communication before STA1 starts data communication, in order to avoid collision. Further, both Band A and Band B may be made broader to start data transmission.

On the other hand, when it has been determined that the PCH of Band B is busy (No in Step S1202), STA1 confirms a result of carrier sensing performed on a channel other than the PCH in Band B (Step S1203). The channel other than the PCH is, for example, an SCH on which carrier sensing has been performed by STA1 at the same time as the PCH.

When STA1 has detected at least one idle channel in Band B (Yes in Step S1204), STA1 selects a channel for use from the detected at least one channel, generates a CA pre-notification frame (refer to FIG. 11) that includes a "CH List In Band" field including a "Band Info" field indicating Band B, and a "CH Info." field in which information regarding the selected channel is given, and transmits the generated frame to STA2 using the PCH of Band A (Step S1205). The determination in Step S1204 is assumed to be Yes in the communication sequence illustrated in FIG. 11.

Further, when STA1 has detected no idle channel in Band B (No in Step S1204), STA1 gives up using carrier aggregation and starts performing a normal communication only using the PCH of Band A, or awaits data transmission using carrier aggregation until STA1 acquires a transmission right in Band B (Step S1206).

Note that how carrier sensing is performed by, for example, STA1 is not limited. Specifically, a channel in which a constant level of power has not been detected during an interval of PIFS may be detected as being idle according to, for example, a method for performing carrier sensing on a secondary channel that is defined in IEEE 802.11. Further, when a transmission terminal includes a plurality of wireless communication apparatuses for Band B, different channels may be set in the respective wireless communication apparatuses, and a channel in which a preamble has not been detected during a back-off period may be detected as being idle.

Further, when there are at least three bands used when carrier aggregation is applied, STA1 confirms, in Step S1203, a result of carrier sensing for each communication band. At the end, STA1 selects a channel for use for each communication band, and transmits, in Step S1205, a CA pre-request frame that only includes one "CH List In Band" field.

Figure 13:
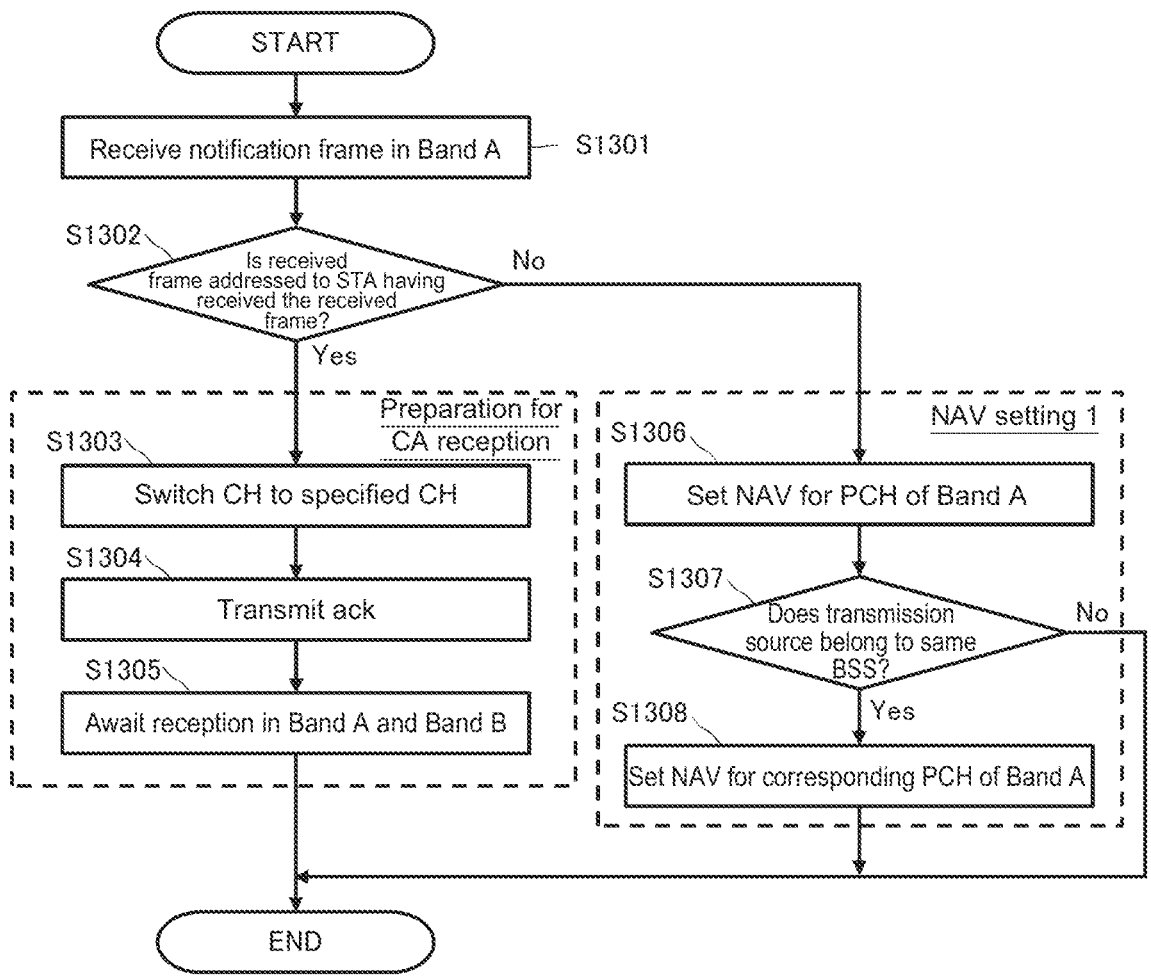
FIG. 13 is a flowchart of detailed procedures of processing of preparing for CA reception and an NAV setting.

FIG. 13 illustrates detailed procedures of processing of preparing for CA reception and an NAV setting in the form of a flowchart, the processing of preparing for CA reception and the NAV setting being respectively performed by STA2 and STA3 (or by a data-reception terminal and another terminal that is not involved in data transmission) in SEQ1005 and SEQ1006 in the communication sequence illustrated in FIG. 10.

When a STA receives a CA pre-notification frame transmitted through Band A by another terminal (for example, STA1) that intends to transmit data using carrier aggregation (Step S1301), the STA determines, using the "RA" field, whether the frame is addressed to the STA (Step S1302).

When it has been determined that the received CA pre-notification frame is addressed to the STA (Yes in Step S1302), the process moves on to CA reception processing (the case in which the STA is STA2 in the example of the communication sequence illustrated in FIG. 10). Further, when it has been determined that the received CA pre-notification frame is not addressed to the STA (No in Step S1302), the process moves on to NAV setting processing 1 (the case in which the STA is STA3 in the example of the communication sequence illustrated in FIG. 10). The processes are described below in the order described above.

First, the CA reception processing performed by STA2 is described. After STA2 receives the CA pre-notification frame addressed to STA2 from STA1 (Yes in Step S1302), STA2 switches the channel of Band B to a channel (an SCH) included in a "CH List In Band" field indicating Band B (Step S1303)

Then, STA2 returns an acknowledgment (ack) frame for the CA pre-notification frame to STA1 using the PCH of Band A (Step S1304). Thereafter, STA2 awaits reception on the PCH of Band A and the SCH of Band B (Step S1305).

Next, the NAV setting processing 1 is described. After STA3 receives, from STA1, the CA pre-notification frame that is not addressed to STA3 (No in Step S1302), STA3 reads information given in "Duration" in the frame, and sets an NAV for the PCH of Band A (Step S1306). This makes it possible to suppress transmission in order to avoid collision in data communication expected to be performed between STA1 and STA2 using the PCH of Band A.

Next, STA3 determines whether STA1, which is a transmission source, belongs to the same BSS as STA 3 (Step S1307). When it has been determined that STA3 belongs to the same BSS as STA1 (Yes in Step S1307), STA3 sets an NAV for a channel in Band B that is used for carrier aggregation (Step S1308). Even if the state of the channel in Band B that is used for carrier aggregation is changed from a busy state to an idle state, data will be communicated between STA1 and STA2 after switching of the channel of Band B is performed. Thus, the setting of an NAV results in preventing STA3 from unnecessarily starting data transmission.

According to the second embodiment, a transmission terminal transmits a CA pre-notification frame to a reception terminal to negotiate a channel that is to be temporarily used upon performing carrier-aggregation communication. This makes it possible to efficiently perform communication using carrier aggregation. Further, only the transmission terminal searches for a clear channel using a result of carrier sensing. This makes it possible to reduce processing burdens imposed on the reception terminal. Further, a surrounding terminal sets an NAV on the basis of the CA pre-notification frame. This makes it possible to prevent a packet collision upon performing carrier-aggregation communication.

Third Embodiment

The operation of communication performed using carrier aggregation has been described above. In the present embodiment, a technology for channel switching using a data-communication channel and a control-signal channel at the same time is described as an application of the operation described above. Note that a diagram of a communication sequence and a transmission frame that are used in the present embodiment are similar to those of the first embodiment. Thus, detailed descriptions thereof are omitted.

Figure 14:
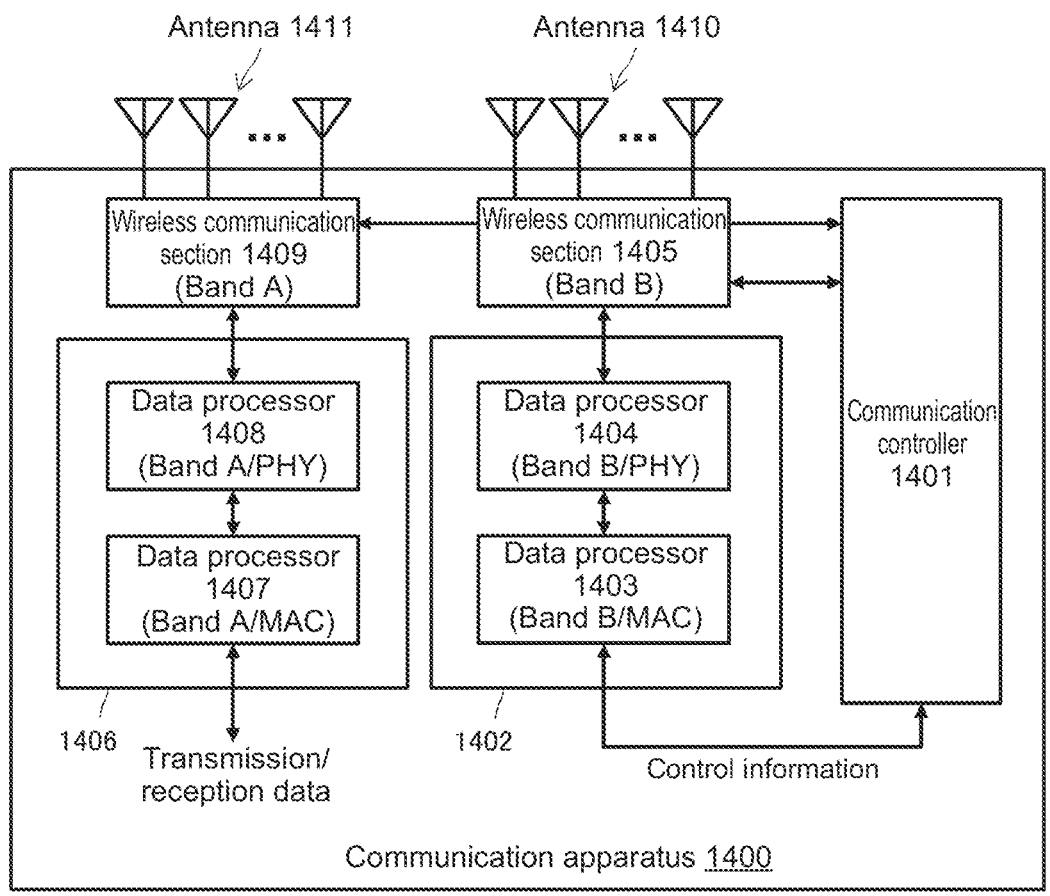
FIG. 14 illustrates an example of a functional configuration of a communication apparatus 1400.

FIG. 14 illustrates an example of a functional configuration of a communication apparatus 1400 that operates as an STA (including an AP). Each component included in the communication apparatus 1400 is described below.

A communication controller 1401 controls an entire operation of the communication apparatus 1400, and, further, the communication controller 1401 performs processing of delivering, to a data processor 1402, control information that is notified to another communication terminal. In the present embodiment, the communication controller 1401 performs selection and switching of a transmission/reception channel in wireless communication sections 1405 and 1409 in order to perform communication using a data-communication channel and a control-signal channel at the same time, and the communication controller 201 generates and acquires a signal including information regarding a clear channel.

The communication apparatus 1400 according to the present embodiment uses two communication bands that are Band A and Band B. However, it is assumed that carrier aggregation is not applied as in the case of the first and second embodiments described above, and the two communication bands are assigned different applications to be used individually. Specifically, Band B is assumed to be a relatively narrow band such as 2.4 GHz to be used to communicate control information having a small data size, whereas Band A is assumed to be a broad band such as 6 GHz to be used to communicate a large amount of data according to the request from an upper layer.

Thus, a data processor that performs data processing in a MAC layer and in a PHY layer includes separate data processors that are a data processor 1406 for Band A and the data processor 1402 for Band B. The data processor 1406 includes a MAC-layer data processor 1407 for Band A and a PHY-layer data processor 1408 for Band A. Further, the data processor 1402 includes a MAC-layer data processor 1403 for Band B and a PHY-layer data processor 1404 for Band B.

The data processor 1406 for Band A primarily generates a transmission signal on the basis of transmission data from an upper layer. Further, the data processor 1406 demodulates a reception signal received from the wireless communication section 1409 for Band A to perform processing of extracting reception data.

The data processor 1402 for Band B generates a transmission signal on the basis of control information received from the communication controller 1401 for Band B. Further, the data processor 1402 demodulates a reception signal received from the wireless communication section 1405 for Band B to perform processing of extracting control information.

The wireless communication section 1409 performs an analog conversion and RF processing with respect to a transmission signal generated by the data processor 1406 to generate a radio signal that uses Band A and is output from an antenna 1411. Further, the wireless communication section 1409 performs RF processing and a digital conversion with respect to a radio signal that uses Band A and is input to the antenna 1411 to generate a reception signal, and delivers the generated reception signal to the data processor 1406.

The wireless communication section 1405 performs an analog conversion and RF processing with respect to a transmission signal generated by the data processor 1402 to generate a radio signal that uses Band B and is output from an antenna 1410. Further, the wireless communication section 1405 performs RF processing and a digital conversion with respect to a radio signal that uses Band B and is input to the antenna 1410 to generate a reception signal, and delivers the generated reception signal to the data processor 1402.

Note that, when a MIMO communication is performed using Band A and a MIMO communication is performed using Band B, the wireless communication sections 1405 and 1409 each include a plurality of antennas, and the PHY-layer data processors 1404 and 1408 each perform spatial multiplexing processing and spatial separation processing.

The communication apparatus 1400 illustrated in FIG. 14 can also be referred to as a communication terminal that includes wireless communication apparatuses for a plurality of communication bands.

Figure 15:
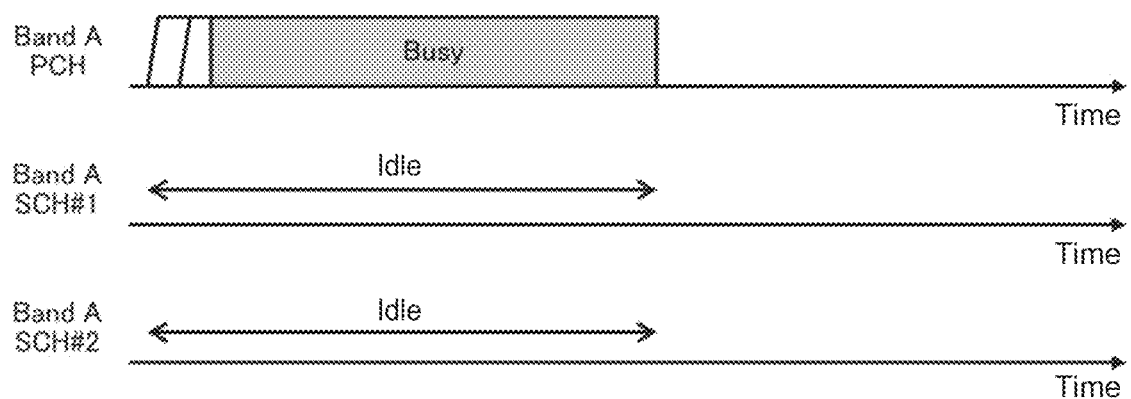
FIG. 15 illustrates an example of performing transmission using the communication band that is Band A.

FIG. 15 illustrates an example in which a certain transmission terminal performs transmission using a communication band that is Band A.

For example, if a certain transmission terminal performs a backoff on a PCH of Band A and if another channel of Band A (SCH1 and SCH2 in the example illustrated in FIG. 5) is idle, there will be a need to await transmission when the other channel becomes busy. It is favorable that a transmission terminal switch the channel to an idle channel for each data transmission upon transmitting data. However, a reception terminal waits only on the PCH of Band A. Thus, if the transmission terminal switches the channel, data communication will not be correctly performed.

Figure 16:
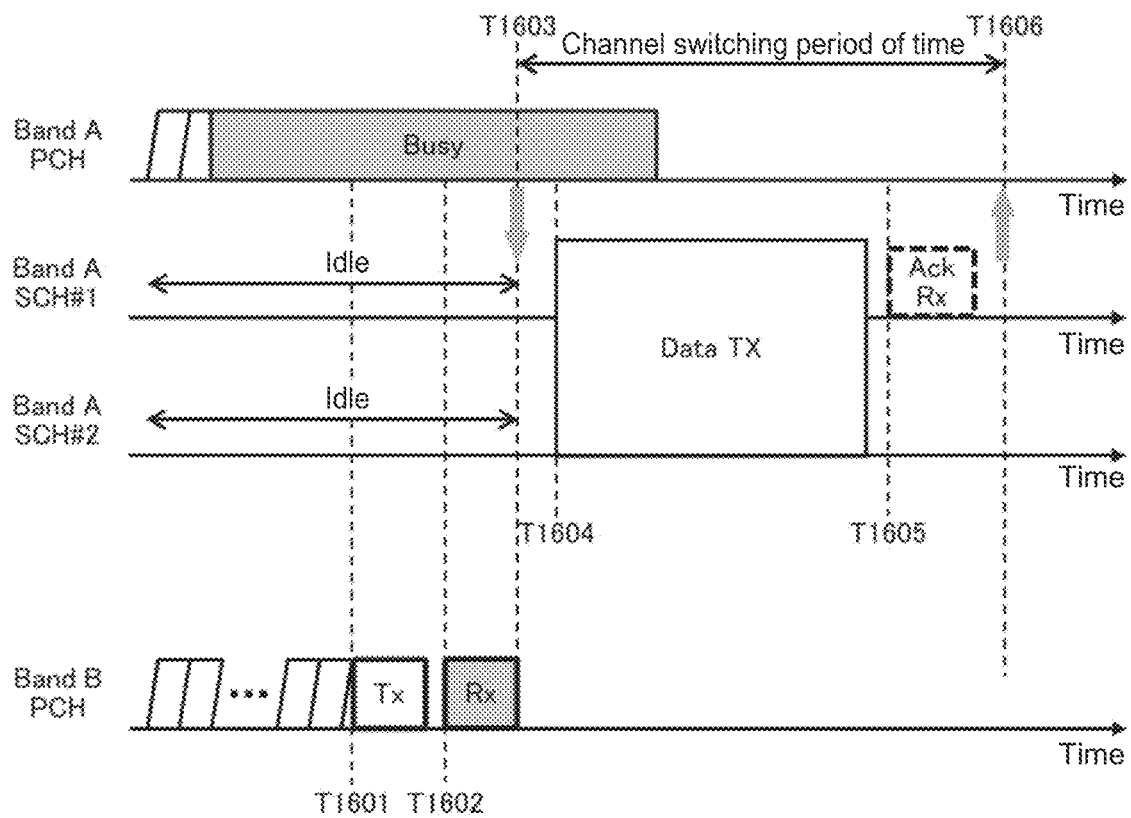
FIG. 16 illustrates an example of performing transmission using the two communication bands that are Band A and Band B.

FIG. 16 illustrates an example in which a certain transmission terminal performs transmission using two communication bands that are Band A and Band B. Here, it is assumed that, in the figure, a CA pre-request frame and a CA pre-response frame are exchanged between a transmission terminal and a reception terminal, and data communication is performed by flexibly switching the channel, as described in the first embodiment.

For example, when a certain transmission terminal performs a backoff on a PCH of Band B for a control signal, and acquires a transmission right at a time T1601, the transmission terminal transmits a CA pre-request frame to a reception terminal using the PCH of Band B for a control signal, the CA pre-request frame including a result of carrier sensing performed by the transmission terminal on Band A for data communication.

In the example illustrated in FIG. 16, the PCH of Band A is busy at the time T1601, whereas SCH #1 and SCH #2 of Band A are idle. Thus, the transmission terminal transmits a CA pre-request frame that includes the "CH Info." field 513 for Band A in which information regarding SCH #1 and SCH #2 of are given.

When the reception terminal also confirms that SCH #1 and SCH #2 of Band A are idle for the reception terminal, the reception terminal temporarily switches the channel for use in Band A from the PCH to SCH #1 and SCH #2, and returns a CA pre-response frame using the PCH of Band B at a time T1602, the CA pre-response frame including the "CH Info." field 513 for Band A in which information regarding SCH #1 and SCH #2 of Band A is given. Then, the reception terminal awaits data reception on SCH #1 and SCH #2 of Band A.

When the transmission terminal confirms, from the received CA pre-response frame, that SCH #1 and SCH #2 of Band A are also idle for the reception terminal, the transmission terminal switches the channel for use in Band B from the PCH to SCH #1 (or SCH #2) at a time T1603. Then, at a time T1604, the transmission terminal transmits data (Data Tx) using a broad band that includes two channels of Band A that are SCH #1 and SCH #2. In other words, when the PCH of Band A, which is a communication band for data transmission, is busy, the transmission terminal can also perform a broadband transmission by switching the channel of Band A to SCH #1 (or SCH #2) in an idle state.

The reception terminal awaits data reception on SCH #1 (or SCH #2) of Band A. Thus, the reception terminal can receive data transmitted in a broad band using SCH #1 and SCH #2 after the reception terminal receives a preamble on SCH #1 (or SCH #2). When the reception terminal successfully receives data, the reception terminal transmits an acknowledgment frame (ack) at a time T1605 using a channel of Band A that is SCH #1 (or SCH #2), and then resets the channel for use in Band A to the PCH from SCH #1 (or SCH #2).

Further, when the transmission terminal receives the acknowledgment frame (ack) from the reception terminal at the time T1605 using the channel of Band A that is SCH #1 (or SCH #2), the transmission terminal subsequently resets the channel for use in Band A to the PCH from SCH #1 (or SCH #2) at the time T1606. Thus, for the transmission terminal, the period of time from the time T1603 to the time T1606 is a "channel switching period of time" in which the channel for use in Band A has been switched to SCH #1 (or SCH #2) from the PCH.

As described above, a CA pre-notification frame and a CA pre-response frame are exchanged between a transmission terminal and a reception terminal in Band B, which is a communication band for control information, and this enables the reception terminal to switch the awaiting channel. This makes it possible to correctly perform data communication using any channel of Band A, which is a communication band for data transmission.

The example of using the frame exchange described in the first embodiment has been described above. However, when a transmission terminal uniquely determines a channel for use and transmits a CA pre-notification frame, as described in the second embodiment, a CA pre-notification frame and a CA pre-response frame are exchanged between the transmission terminal and a reception terminal in a communication band that is Band B, and this enables the reception terminal to switch the awaiting channel in a communication band for data transmission that is Band A. This makes it possible to correctly perform data communication.

Further, in the present embodiment, Band A is defined as being dedicated to data, and Band B is defined as being dedicated to a control signal. However, the communication bands are not particularly limited thereto. Band A and Band B may both transmit data and a control signal.

INDUSTRIAL APPLICABILITY

The technology disclosed herein has been described above in detail with reference to the specific embodiments. However, it is clear that those skilled in the art could make modifications or alterations to the embodiments without departing from the scope of the technology disclosed herein.

The technology disclosed herein is applied to, for example, an IEEE 802.11-based wireless LAN system to switch from a primary channel to another idle channel in each communication band according to a state of the primary channel. This makes it possible to achieve a high efficiency in carrier aggregation in conformity to a scheme of a channel access using CSMA/CA. Of course, the technology disclosed herein is suitably applicable to a wireless LAN system other than the IEEE 802.11-based wireless LAN system.

In other words, the technology disclosed herein has been illustratively described, and should not be restrictively interpreted. The claims should be considered in order to determine the technology disclosed herein.

Note that the technology disclosed herein may also take the following configurations.

(1) A communication apparatus, including:
   a communication section that transmits and receives a radio signal using a first communication band and a second communication band; and a controller that controls an operation of communication performed by the communication section, the controller performing control such that a signal that includes information regarding a clear channel of the second communication band is transmitted using a channel of the first communication band.

(2) The communication apparatus according to (1), in which the controller performs control such that data is transmitted to a transmission destination of the signal using the clear channel included in the signal.

(3) The communication apparatus according to (1) or (2), in which the controller performs control such that data is transmitted to a transmission destination of the signal using one of a plurality of the clear channels of the second communication band, the plurality of the clear channels of the second communication band being included in the signal.

(4) The communication apparatus according to (3), in which the controller performs control such that data is transmitted using a channel that is specified by a response signal from the transmission destination of the signal, the specified channel being from among the plurality of the clear channels included in the signal.

(5) The communication apparatus according to (1) or (2), in which the controller performs control such that the signal includes information regarding one clear channel of the second communication band, and such that data is transmitted to a transmission destination of the signal using the one clear channel of the second communication band.

(6) The communication apparatus according to any one of (1) to (5), in which the controller performs control such that data is transmitted to a transmission destination of the signal using carrier aggregation by use of respective channels of the first communication band and the second communication band.

(7) The communication apparatus according to (1) or (2), in which the controller performs control such that data is transmitted to a transmission destination of the signal using at least one of a plurality of the clear channels of the second communication band, the plurality of the clear channels of the second communication band being included in the signal.

(8) A communication method for performing a wireless communication using a first communication band and a second communication band, the communication method including:

transmitting, using a channel of the first communication band, a signal that includes information regarding a clear channel of the second communication band; and transmitting data to a transmission destination of the signal using the clear channel included in the signal.

(9) A communication apparatus, including:

a communication section that transmits and receives a radio signal using a first communication band and a second communication band; and a controller that controls an operation of communication performed by the communication section, the controller performing control such that a signal that includes information regarding a clear channel of the second communication band is received using a channel of the first communication band.

The communication apparatus according to (9), in which in response to the signal addressed to the communication apparatus being received, the controller performs control such that a reception operation is performed using the clear channel of the second communication band.

(11) The communication apparatus according to (9) or (10), in which the controller performs control such that a reception operation is performed using one of a plurality of the clear channels included in the signal addressed to the communication apparatus.

(12) The communication apparatus according to (9) or (10), in which the controller performs control such that a response signal that includes information regarding a channel selected from a plurality of the clear channels included in the signal addressed to the communication apparatus, is returned.

(13) The communication apparatus according to (12), in which the controller performs control such that a reception operation is performed using the channel included in the response signal.

(14) The communication apparatus according to (9) or (10), in which the signal addressed to the communication apparatus includes information regarding one clear channel, and the controller performs control such that a reception operation is performed using the one clear channel.

(15) The communication apparatus according to any one of (9) to (14), in which the controller controls reception of data transmitted using carrier aggregation by use of respective channels of the first communication band and the second communication band.

(16) The communication apparatus according to (9) or (10), in which the controller performs control such that a reception operation is performed using at least one of a plurality of the clear channels of the second communication band, the plurality of the clear channels of the second communication band being included in the signal addressed to the communication apparatus.

(16-1) The communication apparatus according to (16), in which the controller controls the reception operation of receiving data transmitted in a broad band using the plurality of the clear channels of the second communication band.

(17) The communication apparatus according to (9), in which in response to the signal addressed to another communication apparatus being received, the controller performs control such that transmission waits to be performed in the second communication band.

(18) The communication apparatus according to (9), in which in response to a response signal being received from another communication apparatus, the response signal being a response signal for the signal including the information regarding the clear channel, the controller performs control such that transmission waits to be performed in the second communication band.

(19) A communication method for performing a wireless communication using a first communication band and a second communication band, the communication method including:

receiving, using a channel of the first communication band, a signal that includes information regarding a clear channel of the second communication band; and controlling, on the basis of the information included in the signal, transmission and reception of data that are performed using the second communication band.

REFERENCE SIGNS LIST 200 communication apparatus
201 communication controller
202 data processor
203 MAC-layer data processor
204 PHY-layer data processor (for Band A)
205 PHY-layer data processor (for Band B)
206 wireless communication section (for Band A)
207 wireless communication section (for Band B)
208 antenna (for Band A)
209 antenna (for Band B)
1400 communication apparatus
1401 communication controller
1402 data processor (for Band B)
1403 data processor (for Band B, MAC layer)
1404 data processor (for Band B, PHY layer)
1405 wireless communication section (for Band B)
1406 data processor (for Band B)
1407 data processor (for Band B, MAC layer)
1408 data processor (for Band B, PHY layer)
1409 wireless communication section (for Band B)
1410 antenna (for Band B)
1411 antenna (for Band A)

The invention claimed is:

1. A first communication apparatus, comprising:
a transceiver that transmits and receives a radio signal using a first communication band and a second communication band; and
a controller that controls an operation of communication performed by the transceiver, the controller configured to:
perform a communication initiation process with a second communication apparatus so as to exchange information that identifies which frequency bands the first and second communication apparatus are capable of using and that identifies whether the respective communication apparatus is capable of carrier aggregation;
based on the communication initiation process:
acquire a transmission right for transmitting on a primary channel of the first communication band;
perform a carrier aggregation assessment of the second communication band, the carrier aggregation assessment including:
determining whether or not a primary carrier of the second communication band is unoccupied;
upon determining that the primary carrier of the second communication band is occupied, determining whether or not any secondary carrier of the second communication band is unoccupied;
upon determining that one or more secondary carriers of the second communication band are unoccupied:
transmitting a carrier aggregation pre-request frame to the second communication apparatus on the primary channel of the first communication band; and
in response to the carrier aggregation pre-request frame, receiving a response frame from the second communication apparatus on the primary channel of the first communication band; and
based on the carrier aggregation assessment, perform a carrier aggregation transmission on both of the primary channel of the first communication band and a specific one of the one or more secondary carriers of the second communication band that are unoccupied.

2. The first communication apparatus according to claim 1, wherein the carrier aggregation pre-request frame comprises a list of the one or more secondary carriers of the second communication band that are unoccupied, and the response frame is a carrier aggregation pre-response frame that identifies the specific one of the one or more secondary carriers of the second communication band to be used for the carrier aggregation transmission.

3. The first communication apparatus according to claim 1, wherein the carrier aggregation pre-request frame comprises identifies only the specific one of the one or more secondary carriers of the second communication band that are unoccupied, and the response frame acknowledges that the specific one of the one or more secondary carriers of the second communication band is to be used for the carrier aggregation transmission.

4. A communication method for performing a wireless communication performed by a first communication apparatus using a first communication band and a second communication band, the communication method comprising:
performing a communication initiation process with a second communication apparatus so as to exchange information that identifies which frequency bands the first and second communication apparatus are capable of using and that identifies whether the respective communication apparatus is capable of carrier aggregation;
based on the communication initiation process:
acquiring a transmission right for transmitting on a primary channel of the first communication band;
performing a carrier aggregation assessment of the second communication band, the carrier aggregation assessment including:
determining whether or not a primary carrier of the second communication band is unoccupied;
upon determining that the primary carrier of the second communication band is occupied, determining whether or not any secondary carrier of the second communication band is unoccupied;
upon determining that one or more secondary carriers of the second communication band are unoccupied:
transmitting a carrier aggregation pre-request frame to the second communication apparatus on the primary channel of the first communication band; and
in response to the carrier aggregation pre-request frame, receiving a response frame from the second communication apparatus on the primary channel of the first communication band; and
based on the carrier aggregation assessment, perform a carrier aggregation transmission on both of the primary channel of the first communication band and a specific one of the one or more secondary carriers of the second communication band that are unoccupied.

5. The communication method according to claim 4, wherein the carrier aggregation pre-request frame comprises a list of the one or more secondary carriers of the second communication band that are unoccupied, and the response frame is a carrier aggregation pre-response frame that identifies the specific one of the one or more secondary carriers of the second communication band to be used for the carrier aggregation transmission.

6. The communication method according to claim 4, wherein the carrier aggregation pre-request frame comprises identifies only the specific one of the one or more secondary carriers of the second communication band that are unoccupied, and the response frame acknowledges that the specific one of the one or more secondary carriers of the second communication band is to be used for the carrier aggregation transmission.

7. A non-transitory computer product containing instructions to cause a first communication apparatus to perform a method, the method comprising:

performing a communication initiation process with a second communication apparatus so as to exchange information that identifies which frequency bands the first and second communication apparatus are capable of using and that identifies whether the respective communication apparatus is capable of carrier aggregation;

based on the communication initiation process:
acquiring a transmission right for transmitting on a primary channel of the first communication band;
performing a carrier aggregation assessment of the second communication band, the carrier aggregation assessment including:
determining whether or not a primary carrier of the second communication band is unoccupied;
upon determining that the primary carrier of the second communication band is occupied, determining whether or not any secondary carrier of the second communication band is unoccupied;
upon determining that one or more secondary carriers of the second communication band are unoccupied:
transmitting a carrier aggregation pre-request frame to the second communication apparatus on the primary channel of the first communication band; and
in response to the carrier aggregation pre-request frame, receiving a response frame from the second communication apparatus on the primary channel of the first communication band; and
based on the carrier aggregation assessment, perform a carrier aggregation transmission on both of the primary channel of the first communication band and a specific one of the one or more secondary carriers of the second communication band that are unoccupied.

8. The non-transitory computer product according to claim 7, wherein the carrier aggregation pre-request frame comprises a list of the one or more secondary carriers of the second communication band that are unoccupied, and the response frame is a carrier aggregation pre-response frame that identifies the specific one of the one or more secondary carriers of the second communication band to be used for the carrier aggregation transmission.

9. The non-transitory computer product according to claim 7, wherein the carrier aggregation pre-request frame comprises identifies only the specific one of the one or more secondary carriers of the second communication band that are unoccupied, and the response frame acknowledges that the specific one of the one or more secondary carriers of the second communication band is to be used for the carrier aggregation transmission.

* * * * *